(12) United States Patent
Moore et al.

(10) Patent No.: US 12,090,781 B2
(45) Date of Patent: Sep. 17, 2024

(54) WHEEL HUB WITH INTEGRATED CIRCULAR BRAKE ELEMENT

(71) Applicant: Consolidated Metco, Inc., Vancouver, WA (US)

(72) Inventors: Taylor Moore, Vancouver, WA (US); Frank Severini, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 926 days.

(21) Appl. No.: 16/984,697

(22) Filed: Aug. 4, 2020

(65) Prior Publication Data
US 2021/0039434 A1    Feb. 11, 2021

Related U.S. Application Data

(60) Provisional application No. 62/883,367, filed on Aug. 6, 2019.

(51) Int. Cl.
*B60B 27/00* (2006.01)
*B60B 27/02* (2006.01)
(Continued)

(52) U.S. Cl.
CPC .......... *B60B 27/0052* (2013.01); *B60B 27/02* (2013.01); *F16D 65/123* (2013.01);
(Continued)

(58) Field of Classification Search
CPC . B60B 27/0052; B60B 27/02; B60B 27/0005; F16D 65/123; F16D 2065/1336;
(Continued)

(56) References Cited

U.S. PATENT DOCUMENTS 5,568,846 A * 10/1996 Dagh .................. B60B 27/0052
                                                                  188/218 XL
6,135,247 A * 10/2000 Bodin ..................... B60B 27/00
                                                                  188/218 XL
(Continued)

FOREIGN PATENT DOCUMENTS

CN         1193301 A    9/1998
CN       103097146 A    5/2013
(Continued)

OTHER PUBLICATIONS

Extended European Search Report from related European Application No. 20849366.8 dated Jul. 25, 2023; 11 pages.
(Continued)

*Primary Examiner* — Jason R Bellinger
(74) *Attorney, Agent, or Firm* — Fitch, Even, Tabin & Flannery LLP

(57) ABSTRACT

In one aspect, a wheel hub apparatus including a wheel hub that is rotatable about a central axis and has a unitary, one-piece construction. The wheel hub apparatus further includes a circular brake element having a unitary, one-piece construction and extending about the wheel hub. The wheel hub and the circular brake element include engaged portions securing the wheel hub and the circular brake element together. The engaged portions of the wheel hub and the circular brake element fix the circular brake element against axial movement along the wheel hub. In this manner, the engaged portions of the wheel hub and the circular brake element provide a mechanical joint that connects the wheel hub and the circular brake element using the material of the wheel hub and the circular brake element.

35 Claims, 28 Drawing Sheets

(51) Int. Cl.
*F16D 65/12* (2006.01)
*F16D 65/02* (2006.01)

(52) U.S. Cl.
CPC ... *B60B 2310/202* (2013.01); *B60B 2310/321* (2013.01); *F16D 2065/1308* (2013.01); *F16D 2065/1336* (2013.01); *F16D 2250/0007* (2013.01); *F16D 2250/0061* (2013.01)

(58) Field of Classification Search
CPC ..... F16D 2065/1344; F16D 2065/1356; F16D 2065/1384
See application file for complete search history.

(56) References Cited

U.S. PATENT DOCUMENTS

| | | | |
|---|---|---|---|
| 6,149,244 | A | 11/2000 | Wagner |
| 6,357,557 | B1 | 3/2002 | Di Ponio |
| 6,910,556 | B1 | 6/2005 | Baumgartner |
| 7,594,568 | B2 | 9/2009 | Hanna |
| D833,348 | S | 11/2018 | Hammer |
| 10,138,963 | B2 * | 11/2018 | Chung ................ F16D 65/0006 |
| 10,267,370 | B2 | 4/2019 | Hammer |
| 10,724,592 | B2 * | 7/2020 | Torstveit ................ F16D 65/84 |
| 2001/0052725 | A1 | 12/2001 | Koschinat |
| 2002/0104721 | A1 | 8/2002 | Schaus |
| 2003/0094849 | A1 | 5/2003 | Joki |
| 2004/0040803 | A1 | 3/2004 | Debus |
| 2007/0119667 | A1 | 5/2007 | Hanna |
| 2009/0056134 | A1 | 3/2009 | Kleber |
| 2011/0061980 | A1 * | 3/2011 | Anderson ................ B22C 9/10 188/218 XL |
| 2011/0240422 | A1 | 10/2011 | Lathwesen |
| 2011/0291467 | A1 * | 12/2011 | Severini ................ F16C 19/548 301/105.1 |
| 2013/0048448 | A1 | 2/2013 | Hanna |
| 2013/0075208 | A1 | 3/2013 | Lee |
| 2014/0326551 | A1 * | 11/2014 | Anderson ............... F16D 65/12 164/75 |
| 2015/0136546 | A1 * | 5/2015 | Kim ................... B22D 19/0072 188/218 XL |
| 2017/0227077 | A1 | 8/2017 | Hammer |
| 2019/0003540 | A1 | 1/2019 | Paul |

FOREIGN PATENT DOCUMENTS

| | | |
|---|---|---|
| CN | 103453280 A | 12/2013 |
| CN | 103769815 A | 5/2014 |
| CN | 107428199 A | 12/2017 |
| CN | 109790890 A | 5/2019 |
| CN | 109838460 A | 6/2019 |
| DE | 102004049355 A1 | 4/2006 |
| EP | 3205900 A1 | 8/2017 |
| TW | 201831341 A | 9/2018 |
| WO | 9928641 A2 | 6/1999 |

OTHER PUBLICATIONS

International Search Report and Written Opinion from corresponding PCT Application No. PCT/US2020/044967 dated Jan. 19, 2021; 30 pages.
Invitation to Pay Additional Fees from related International Patent Application No. PCT/US2020/044967 dated Oct. 28, 2020; 5 pages.
SAF-Holland Integral™ Disc Brake product brochure from Midwest Wheel website, https://www.midwestwheel.com/index-6.php?ID=08&title=Brakes,%20Brake%20Parts%20and%20Lining; publicly available before Aug. 6, 2019; 2 pages.
Canadian Office Action from related Canadian Application No. 3,148,098 dated Oct. 23, 2023; 11 pages.
Chinese Office Action from related Chinese Patent Application No. 202080054712.5 dated Jan. 23, 2024, with machine translation; 22 pages.
Grant Search Report from related Chinese Patent Application No. 202080054712.5 dated Jul. 26, 2024; 2 pages.

* cited by examiner

WHEEL HUB WITH INTEGRATED CIRCULAR BRAKE ELEMENT

CROSS-REFERENCE TO RELATED APPLICATION

This application claims benefit of U.S. Provisional Application No. 62/883,367 filed Aug. 6, 2019, which is hereby incorporated herein by reference in its entirety.

FIELD

This disclosure relates to wheel hubs for vehicles and, more specifically, wheel hubs that include a circular brake element.

BACKGROUND

A wheel hub assembly connects a wheel of a vehicle to an axle of the vehicle. Wheel hub assemblies are often used in commercial vehicles, such as in tractor-trailers. Wheel hub assemblies often include a wheel hub and a circular brake element, such as a drum for a drum brake system or a rotor for a disc brake system. A brake rotor is conventionally connected to the associated wheel hub using fasteners. In one prior approach, a brake rotor was connected to a wheel hub using a multitude of small clips that were individually installed to keep the brake rotor on the wheel hub. The process of assembling a wheel hub and a brake rotor using conventional approaches may be a complex, time-consuming, and expensive process for a manufacturer.

SUMMARY

In accordance with one aspect of the present disclosure, a wheel hub apparatus is provided for a commercial vehicle. The wheel hub apparatus includes a wheel hub that is rotatable about a central axis and has a unitary, one-piece construction. The wheel hub has an inboard end portion, an outboard end portion, and a through opening extending from the inboard end portion to the outboard end portion. The wheel hub has a wheel hub mounting portion that is axially intermediate the inboard and outboard end portions of the wheel hub. In one embodiment, the wheel hub mounting portion includes a flange and the wheel hub apparatus includes fasteners protruding from the flange. The fasteners fit into openings of a wheel and locking elements such as nuts are used to secure the wheel to the flange.

The wheel hub apparatus further includes a circular brake element having a unitary, one-piece construction and extending about the wheel hub. The wheel hub and the circular brake element include engaged portions securing the wheel hub and the circular brake element together. The engaged portions of the wheel hub and the circular brake element fix the circular brake element against axial movement along the wheel hub. In this manner, the engaged portions of the wheel hub and the circular brake element provide a mechanical joint that connects the wheel hub and the circular brake element using the material of the wheel hub and the circular brake element. This stands in contrast to some prior approaches that utilize many fasteners or clips to connect a wheel hub and a brake rotor.

In accordance with another aspect of the present disclosure, a wheel hub apparatus is provided that includes a wheel hub having a unitary, one-piece construction that is configured to have a wheel mounted thereon. The wheel hub apparatus includes a pair of wheel bearings having openings to receive a vehicle spindle and wheel bearing seats of the wheel hub to support the wheel bearings. The wheel hub apparatus further includes a circular brake element. One of the wheel hub and the circular brake element is formed in situ on the other of the wheel hub and the circular brake element. The wheel hub apparatus further includes projections and recesses of the wheel hub and the circular brake element. The projections extend in the recesses to transfer loading between the circular brake element and the wheel hub during a braking operation. The in situ forming of the one of the wheel hub and the circular brake element on the other of the wheel hub and circular brake element provides a high-strength connection between the wheel hub and the circular brake element. Further, the projections and recesses may transfer torque from the circular brake element to the wheel hub as a braking device, such as a brake caliper, slows rotation of the circular brake element.

The present disclosure also provides a method of producing a wheel apparatus that includes casting one of a wheel hub and a circular brake element. The wheel hub has a unitary, one-piece configuration and is configured to have a wheel mounted thereon. The wheel hub includes a pair of bearing seats. The method further includes positioning the one of the wheel hub and the circular brake element in a mold and casting the other of the wheel hub and the circular brake element on the one of the wheel hub and the circular brake element using a mold. The method may thereby provide a wheel hub with an integrated circular brake element, the wheel hub and integrated circular brake element ready for assembly with other components to produce a wheel hub assembly. In one embodiment, the mold is a sand mold. Further, casting the one of the wheel hub and the circular brake element may include using a first sand mold and casting the other of the wheel hub and the circular brake element may include using a second sand mold.

DETAILED DESCRIPTION

In accordance with one aspect of the present disclosure, a wheel hub apparatus is provided that includes a wheel hub and a circular brake element, such as a disc brake rotor, formed on the wheel hub. The circular brake element may be formed on the wheel hub by, for example, casting the circular brake element on the wheel hub. The wheel hub and circular brake element include a plurality of engaged portions, such as projections and recesses, that secure the circular brake element to the wheel hub in the radial and circumferential directions.

In one embodiment, the projections and recesses include interlocking projections and recesses that fix the circular brake element to the wheel hub. The projections are resilient and flex to accommodate expansion and contraction of the circular brake element as the circular brake element expands and contracts due to temperature change of the circular brake element during operation of the vehicle. The interlocking projections and recesses may include a plurality of interlocking undercut recesses and complimentary, enlarged portions of the projections in the undercut recesses. The interlocking projections and recesses resist separation of the rotor from the wheel hub, even if the circular brake element fractures during operation.

Figure 1:
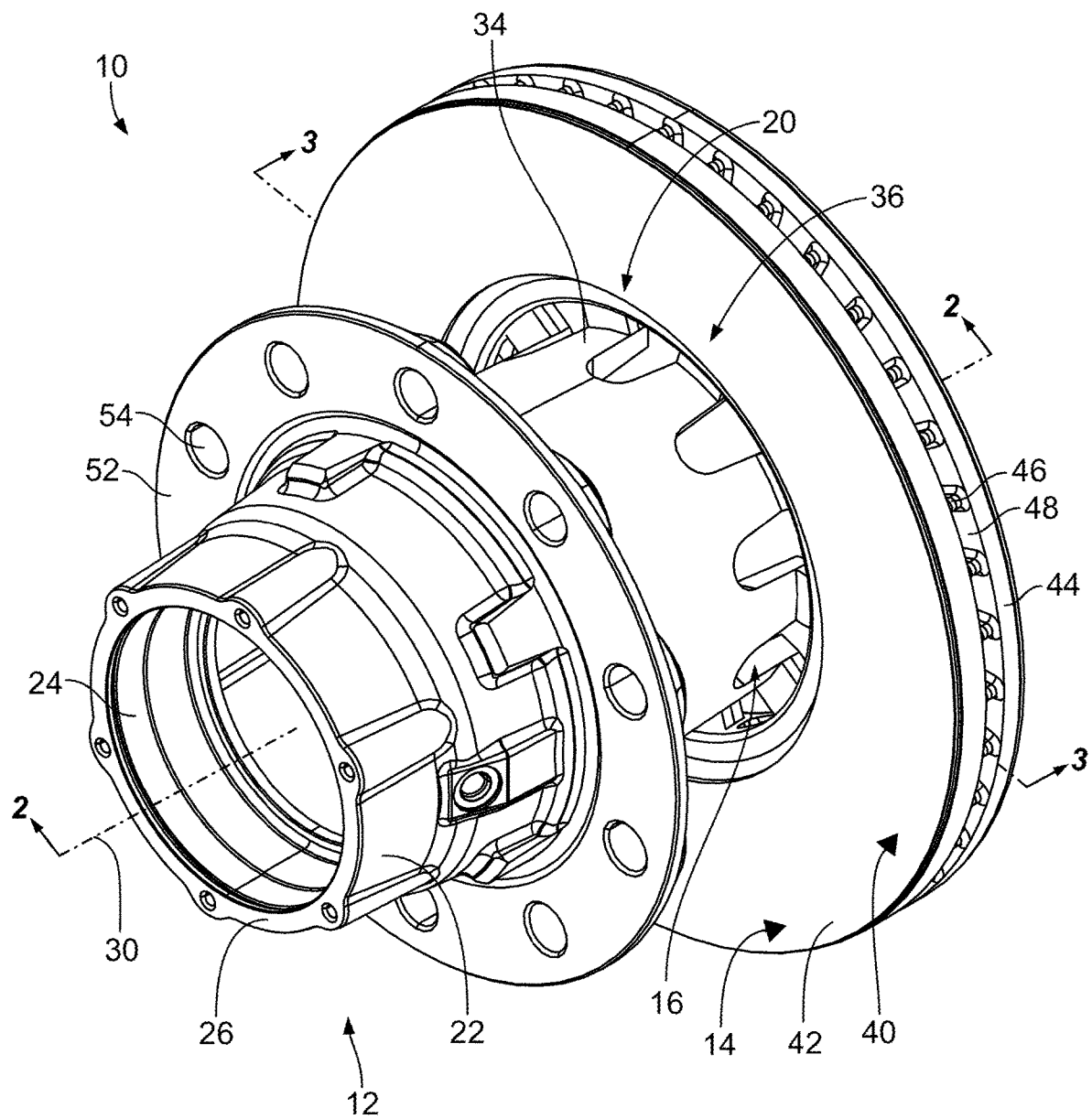
FIG. 1 is a perspective view of a wheel hub apparatus including a wheel hub having an integrated brake rotor.

With reference to FIG. 1, a wheel hub apparatus 10 is provided that includes a wheel hub 12 and a circular brake element, such as a rotor 14, integrated therewith. The wheel hub apparatus 10 has a direct mechanical connection 20 between the wheel hub 12 and the rotor 14. The direct mechanical connection 20 permanently joins the wheel hub 12 and the rotor 14. The wheel hub 12 is formed, such as by casting, and the rotor 14 is formed over a connecting portion 16 of the wheel hub 12. The rotor 14 is thereby molded in situ with the wheel hub 12 to form the direct mechanical connection 20 therebetween. The casting of the wheel hub 12 may be performed using a first mold and the casting of the rotor 14 on the wheel hub 12 may be performed using a different, second mold. In other embodiments, a single mold may be used to cast both the wheel hub 12 and the rotor 14 thereon. The over-molded rotor 14 provides a secure mechanical connection between the wheel hub 12 and the rotor 14 without fasteners. In other words, the wheel hub 10 includes a direct mechanical joint that secures the rotor 14 to the wheel hub 12. In this manner, the wheel hub 12 and rotor 14 may be joined without the use of fasteners or intermediate components therebetween. In another embodiment, the rotor 14 is formed, such as by casting, and the wheel hub 12 is formed on a connecting portion, such as a mounting flange, of the rotor 14.

In one approach, the wheel hub 12 is cast from a metallic material, such as iron, steel, aluminum, or compacted graphite cast iron, and the rotor 14 is cast from the same or a different metallic material, such as iron, aluminum, steel, or compacted graphite cast iron, over the connecting portion 16 of the wheel hub 12. As one example, the wheel hub 12 is made of ductile iron and the rotor 14 is made of a gray iron. In some embodiments, the materials of the wheel hub 12 and the rotor 14 may chemically bond together.

Figure 2A:
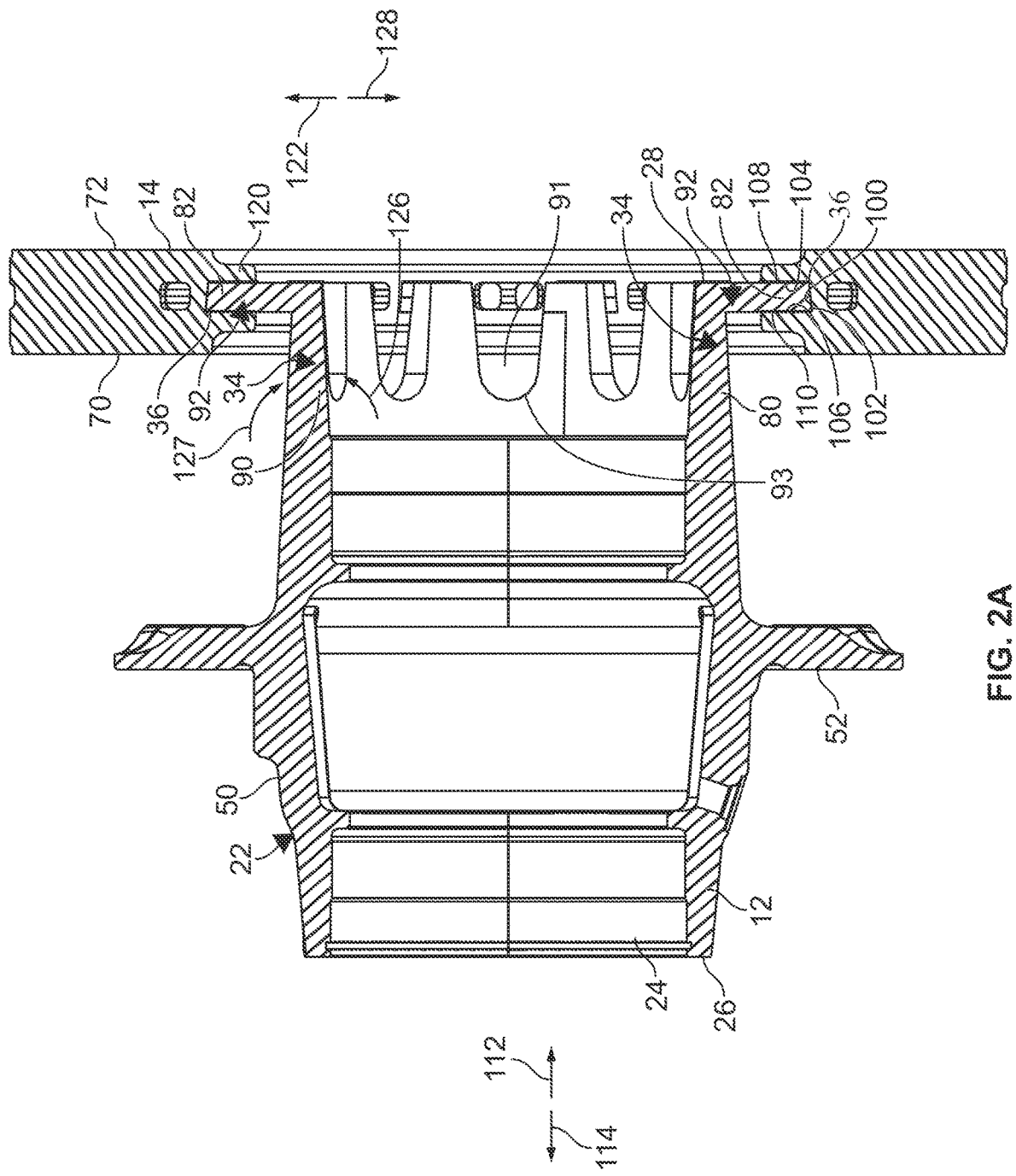
FIG. 2A is a cross-sectional view taken across line 2-2 in FIG. 1 showing the wheel hub having projections that are received in recesses of the brake rotor.

Regarding FIG. 2A, in one embodiment the wheel hub 12 has a unitary, one-piece construction and the rotor 14 has a unitary, one-piece construction. The wheel hub 12 includes a body 22 having a through opening 24 that extends from an outboard end portion 26 to an inboard end portion 28 of the wheel hub 12. The wheel hub 12 has a longitudinal axis 30 extending through a center of the through opening 24 intermediate the outboard end portion 26 and the inboard end portion 28. The wheel hub 12 and the rotor 14 have engaged portions that fix the rotor 14 against axial movement along the wheel hub 12. For example, the connecting portion 16 of the wheel hub 12 includes one or more projections 34 that engage one or more recesses 36 of the rotor 14. In another embodiment, the rotor 14 includes projections that engage recesses of the wheel hub 12.

Regarding FIG. 1, the rotor 14 includes a rotor body 40 having an outboard braking portion 42 with an outboard braking surface 70, an inboard braking portion 44 with an inboard braking surface 72, vanes 46 connecting the inboard and outboard braking portions 42, 44, and vents or ducts 48 circumferentially between the vanes 46. Air may flow through ducts 48 and across inner surfaces of the inner and outer braking portions 42, 44 which helps cool the inner and outer braking portions 42, 44.

Regarding FIGS. 1 and 2A, the hub body 22 includes a side wall 50 extending intermediate the end portions 26, 28. The wheel hub 12 includes one or more wheel mounting portions, such as a flange 52 extending radially outward from the side wall 50 including one or more openings 54 spaced circumferentially thereabout. The openings 54 receive fasteners, such as bolts or studs, to connect a rim of a wheel to the wheel hub 10. In this manner, the wheel rim may be readily connected to the wheel hub 12 and the rotor 14 integrated therewith.

Regarding FIG. 2A, during braking of the vehicle, friction forces are applied to brake surfaces 70 and/or 72 of the rotor 14. The friction forces generate heat and may cause expansion of the rotor 14. The rotor 14 subsequently cools and contracts after braking. Each projection 34 of the wheel hub 12 includes a base portion 80 connected to the side wall 50 and a free end portion 82 received in one of the recesses 36. In one embodiment, each projection 34 includes a leg portion 90 extending axially and a foot portion 92 extending transversely to the leg portion 90. The projections 34 are configured to resiliently deform, such as one or more portions of each projection 34 bending and/or elongating/contracting, with expansion and contraction of the rotor 14. For example, the base portion 80, the leg portion 90, and/or the foot portion 92 of each projection 34 may resiliently deform. The wheel hub 12 includes openings 91 between the leg portions 90 that reduce the material of the wheel hub 12 near the leg portions 90 and increase the flexibility of the base portions 80 and/or leg portions 90. The wheel hub 12 also includes curved portions 93 connecting the leg portions 90 that reduce stress in the base portions 80 as the leg portions 90 bend. For example, as a mounting flange of the rotor 14, such a radially inner portion 120, expands radially outward in direction 122 due to heating of the rotor 14, the base portion 80 and/or leg portion 90 of one or more of the projections 34 bends to permit the leg portion 90 to move generally in direction 126. The bending of the base portion 80 and/or the leg portion 90 of the one or more projections 34 also permits the foot portion 92 that is engaged in the recess 36 to shift radially outwardly in direction 122 with the radially inner portion 120 of the rotor 14. Conversely, the base portion 80 and/or the leg portion 90 may bend to permit the leg portion 90 to rebound in direction 127 and the foot portion 92 to shift in radial direction 128 as the radially inner portion 120 of the rotor 14 contracts due to cooling of the rotor 14.

Regarding FIG. 2A, the foot portion 92 of the projection 34 includes an end surface 100 abutting a wall portion 102 of the associated recess 36. The abutting contact between end surface 100 and wall portion 102 maintains the concentricity of the wheel hub 12 and rotor 14 centered on the axis 30. The foot portion 92 also includes surfaces 104, 106 confronting surfaces 108, 110 of the recess 36 as shown in FIG. 2A. The confronting surfaces 104, 108 and 106, 110 fix the rotor 14 against axial movement in directions 112, 114 along the wheel hub 12. In one embodiment, although the rotor 14 is fixed against axial movement along the wheel hub 12, the rotor 14 may shift slightly in axial directions 112, 114 with the foot portions 92 engaged therewith as the rotor 14 thermally expands and contracts and the base portions 80 and/or leg portions 90 flex to accommodate the expansion and contraction of the rotor 14.

Figure 2B:
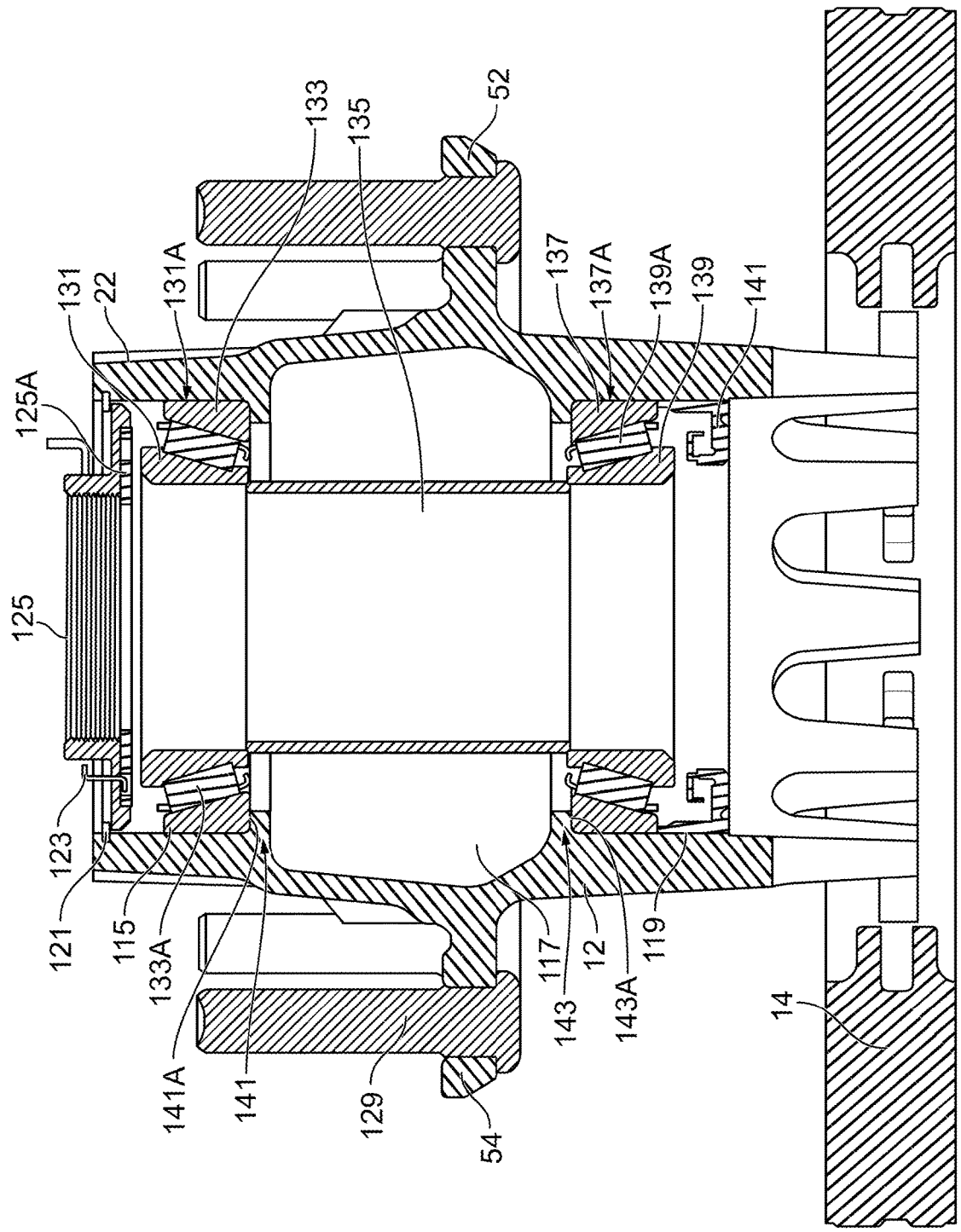
FIG. 2B is a cross-sectional view of the wheel hub apparatus of FIG. 1 showing the wheel hub apparatus including bearings and other internal components in the wheel hub.

Turning to FIG. 2B, the wheel hub 10 may include various internal components to facilitate rotation of the wheel hub 12 and wheel connected thereto about the axis 30. The hub body 22 defines compartments 115, 117, and 119. The compartment 115 receives a snap ring 121, a snap ring adapter 123, a spindle lock such as a spindle nut 125, and a spindle nut lock washer 125A that secure the wheel hub 10 on a spindle of a vehicle axle. The compartment 115 also receives an outboard wheel bearing 131A including an outboard bearing cone 131, roller bearings 133A, and an outboard bearing cup 133. The compartment 117 receives a bearing spacer 135 and lubricant. The compartment 119 receives an inboard wheel bearing 137A including an inboard bearing cup 137, an inboard bearing cone 139, and roller bearings 139A. The bearing cones 131, 139 have central through openings that receive the axle spindle and the bearing spacer 135 maintains a set axial distance between the bearing cones 131, 139. The wheel hub 10 includes wheel bearing seats 141, 143 to support the bearings 131A, 137A in the through opening 24. In one embodiment, the wheel bearing seats 141, 143 include annular seating surfaces 141A, 143A facing in opposite axial directions. Further, the wheel hub 10 may include wheel studs 129 received in the openings 54 of the flange 52.

Figure 3:
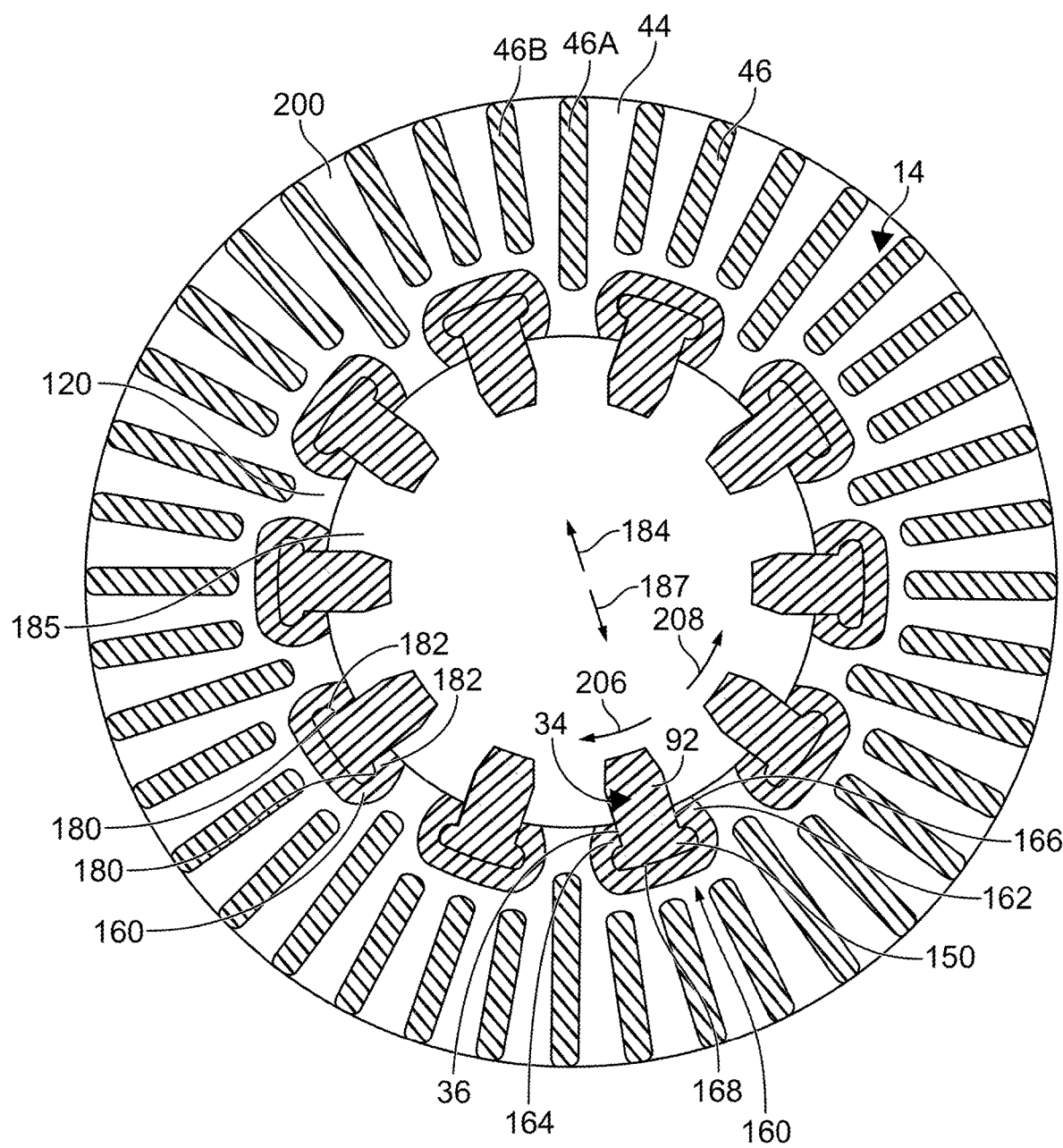
FIG. 3 is a cross-sectional view taken across line 3-3 in FIG. 1 showing enlarged portions of the wheel hub projections received in recesses of the rotor which lock the rotor to the wheel hub projections in the radial and circumferential directions.

Regarding FIG. 3, the wheel hub 10 includes interlocking recesses 36 and complimentary projections 34 that secure the rotor 14 to the wheel hub 12. In one embodiment, the foot portion 92 of each projection 34 includes an enlarged portion 150 engaged with a retainer 160 of the associated recess 36 of the rotor 14. In one embodiment, the retainer 160 includes a C-shaped wall 162 axially between the inboard and outboard plate portions 42, 44. The retainer 160 has a neckdown portion 164 defining a narrow portion 166 of the recess 36 and an enlarged end portion 168 of the recess 36. The enlarged end portion 168 may be wider in the circumferential direction than the narrow portion 166. In one embodiment, the enlarged portion 150 of the projection 34 has a T-shaped configuration and the C-shaped wall 162 surrounds the enlarged portion 150. The interlocking engagement between the enlarged portions 150 of the hub projections 34 and the retainers 160 of the rotor 14 locks the rotor 14 to the wheel hub 12 and resists relative circumferential movement of the rotor 14 relative to the wheel hub 12 in directions 206, 208.

Regarding FIG. 3, the neckdown portion 164 of the retainer 160 has a pair of stop surfaces 182 that extend toward one another and form undercuts of the recess 36. The enlarged portion 150 of the projection 34 has a pair of underside surfaces 180 that abuts the stop surfaces 182 of the retainer 160. The engagement between the surfaces 180, 182 resists pull-through of the foot portion 92 radially inward in direction 184 into a center opening 185 of the rotor 14 and radially outward movement of the foot portion 92 in direction 187. Further, in the event of a fracture of the rotor 14, the interlocking engagement between the enlarged head portions 150 of the wheel hub 12 and the retainers 160 of the rotor 14 keeps the fractured portions of the rotor 14 secured to the wheel hub 12. By keeping the fractured portions of the rotor 14 connected to the wheel hub 12, the sections of the rotor 14 are kept from falling off of the rotating wheel hub 10.

Regarding FIG. 3, the rotor 14 includes a radially outer portion 200, the radially inner portion 120, and the vanes 46. The vanes 46 may include a pattern of longer vanes 46A and shorter vanes 46B. The shorter vanes 46B may be radially aligned with the retainers 160 whereas the longer radially extending support members 46B are radially misaligned with the retainers 160. In another embodiment, the rotor 14 includes pin vanes.

Figure 4:
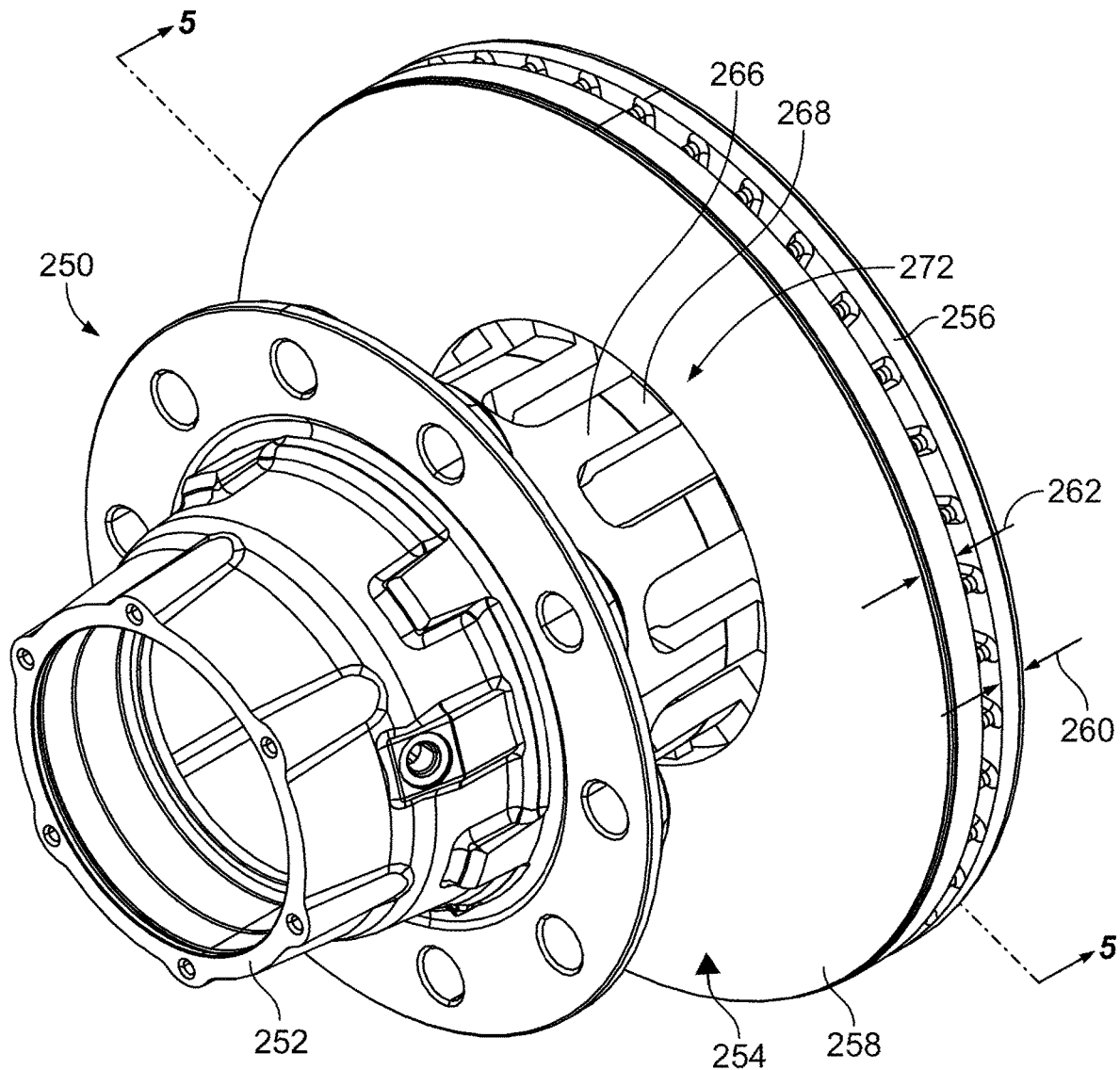
FIG. 4 is a perspective view of a wheel hub apparatus including a wheel hub and a rotor.

Regarding FIG. 4, a wheel hub apparatus 250 is provided that is similar in many respects to the wheel hub apparatus 10 discussed above such that differences between the two will be highlighted. The wheel hub apparatus 250 includes a wheel hub 252 and a rotor 254. The rotor 254 includes an inboard braking portion 256 and an outboard braking portion 258. The inboard braking portion 256 has a thickness 260 that may be less than a thickness 262 of the outboard braking portion 258. The thicker outboard braking portion 258 includes one or more recesses 272 (see FIG. 5) that engage one or more projections 266 of the hub 252.

Figure 5:
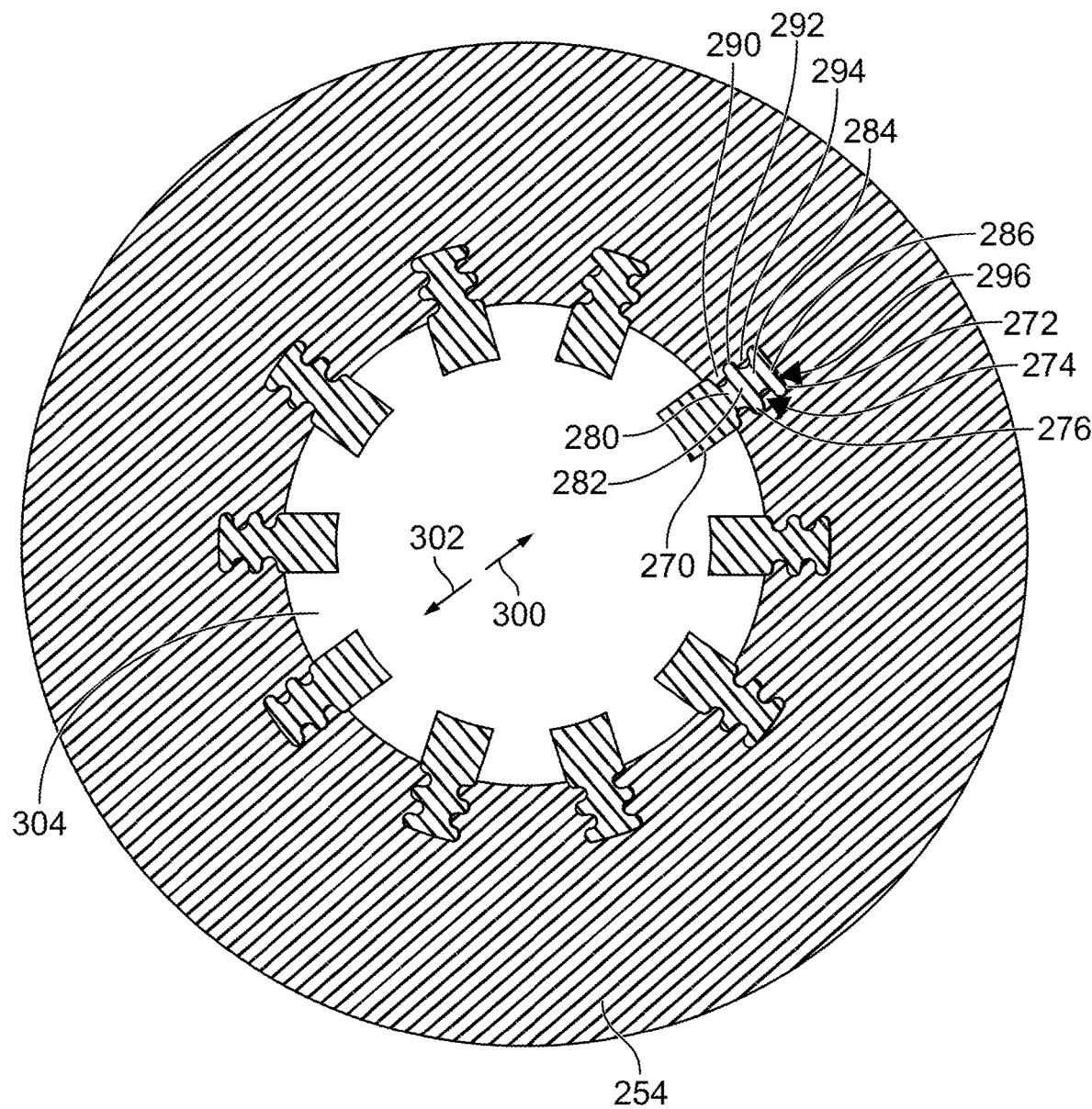
FIG. 5 is a cross-sectional view taken across line 5-5 in FIG. 4 showing interlocking portions of projections of the wheel hub and recesses of the rotor that secure the rotor to the wheel hub.

Regarding FIGS. 4 and 5, each projection 266 includes a leg portion 268 and a foot portion 270 engaged with an associated recess 272 of the rotor 254. Each foot portion 270 and recess 272 includes meshed projections 274, 276 that lock the foot portion 270 of the wheel hub 252 in the recess 272 of the rotor 254. In one embodiment, the foot portion 270 includes an undulating outer profile and the recess 272 has a similar undulating profile. For example, the foot portion 270 may include a radially inner narrow portion 280, a radially inner enlarged portion 282, a radially outer narrow portion 284, and a radially outer enlarged portion 286. Likewise, the recess 272 includes a radially inner neckdown portion 290, a radially inner enlarged portion 292, a radially outer neckdown portion 294, and a radially outer enlarged portion 296. The alternating narrow/wide/narrow/wide pattern of the portions of the foot portion 270 permits the strength of the foot portion 270 and the rotor 254 in shear loading to resist radial movement of the foot portion 270 relative to the rotor 254. For example, the interlocking engagement between the projection foot portion 270 and the rotor 254 resists radial pull-through of the foot portion 270 in radial direction 302 into a center opening 304 of the rotor 254 and outward movement of the foot portion 270 in radial direction 300.

Figure 6:
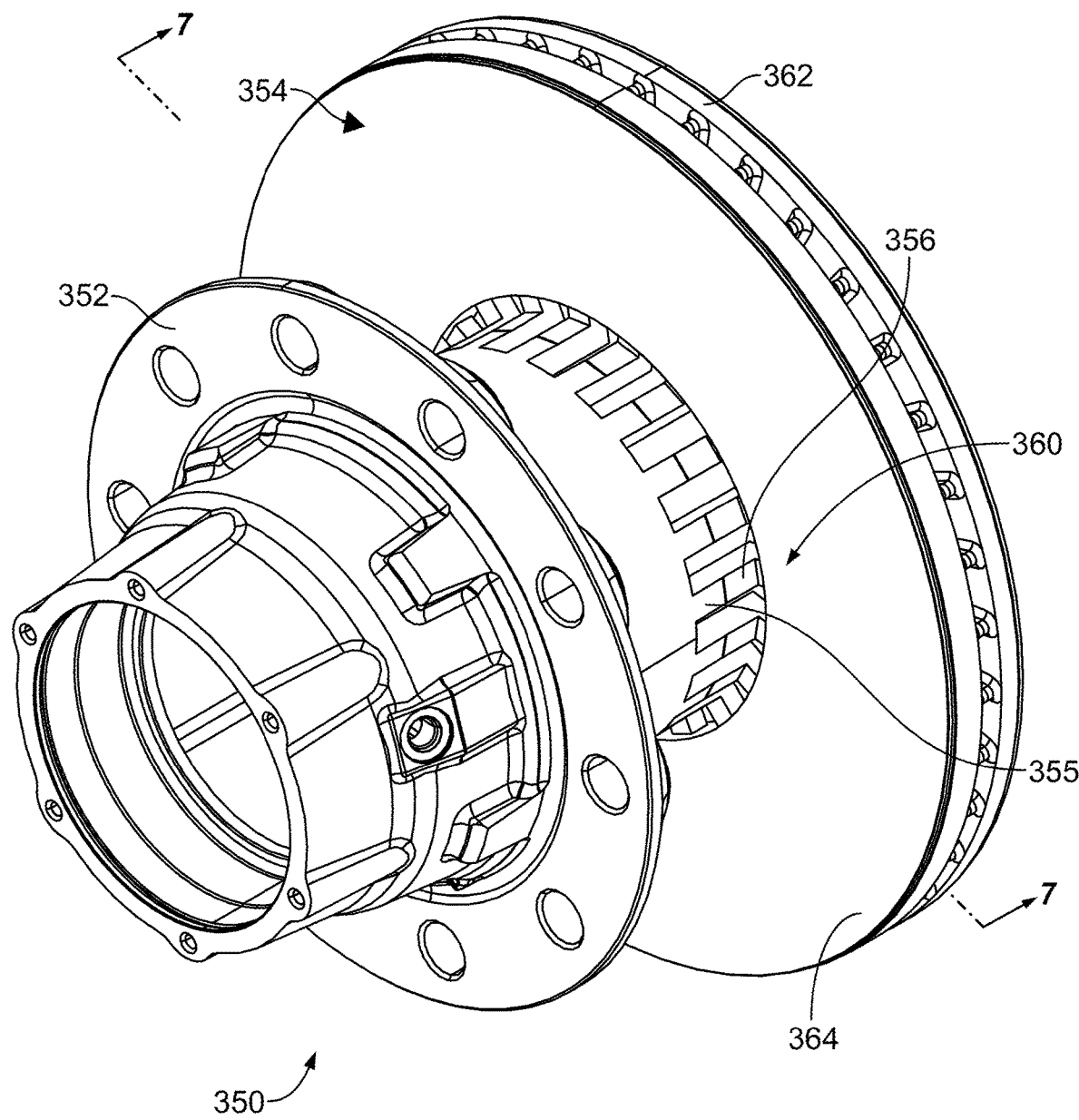
FIG. 6 is a perspective view of a wheel hub apparatus including a wheel hub and a rotor.
Figure 7:
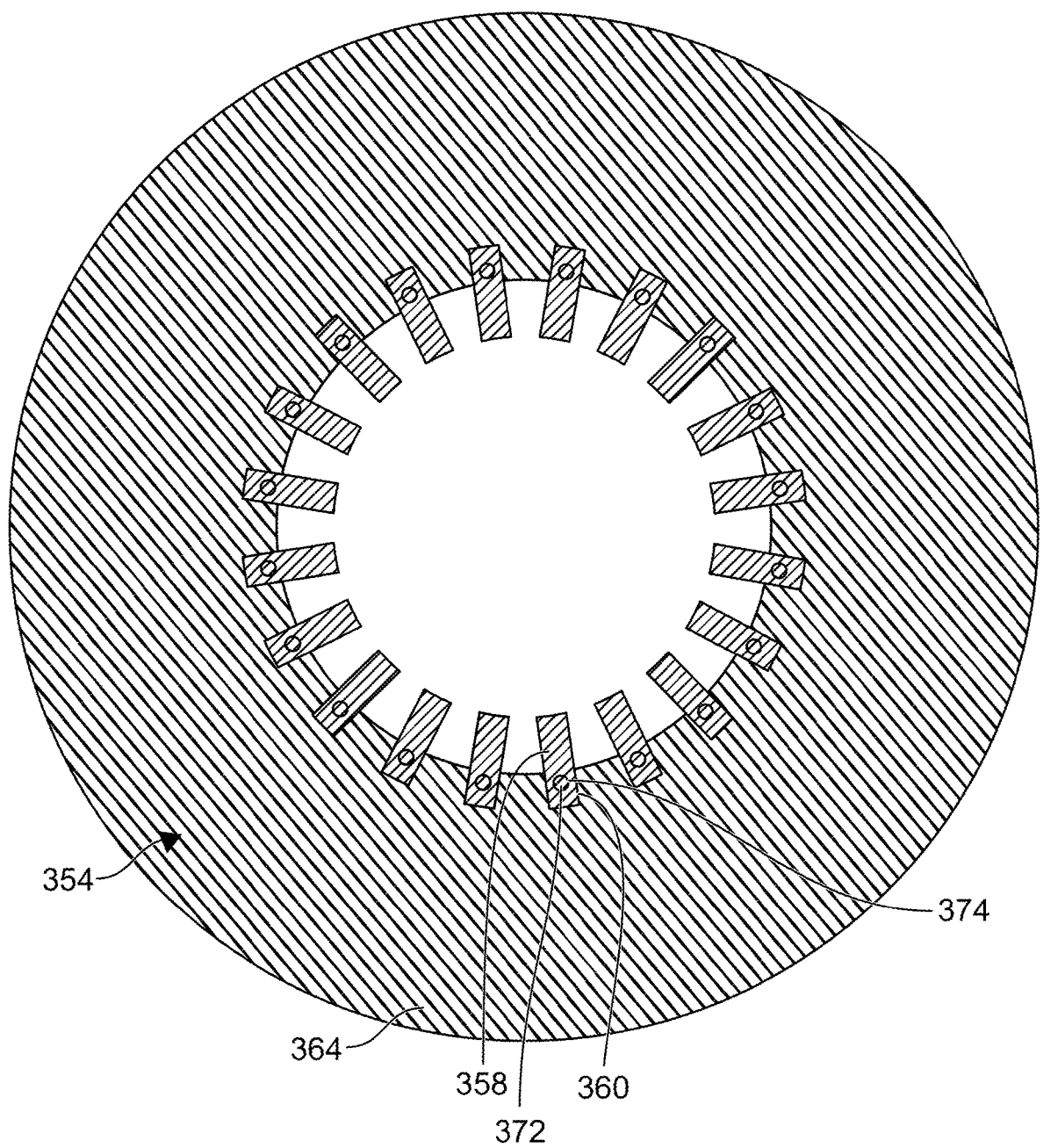
FIG. 7 is a cross-sectional view taken across line 7-7 in FIG. 6 showing pin portions of the rotor extending through openings of projections of the wheel hub to secure the projections in the rotor.

With reference to FIGS. 6 and 7, a wheel hub apparatus 350 is provided that is similar in many respects to the wheel hubs 10, 250 discussed above such that differences will be highlighted. The wheel hub apparatus 350 includes a wheel hub 352 and a rotor 354. The wheel hub 352 includes one or more projections 355 that include leg portions 356 and foot portions 358 that are engaged with recesses 360 of the rotor 354. In one embodiment, the rotor 354 includes an inboard braking portion 362, and a thicker, outboard braking portion 364. The outboard braking portion 364 includes the recesses 360 thereof. To secure the foot portions 358 in the recesses 360, the recesses 360 of the outboard braking portion 364 include retainers, such as pin portions 372 extending through openings 374 of the foot portions 358. In this manner, the mating arrangement of the recess 360, the rotor pin portion 372, and the wheel hub foot portion 358 resists radial relative movement between the foot portions 358 and the recesses 360.

Figure 8:
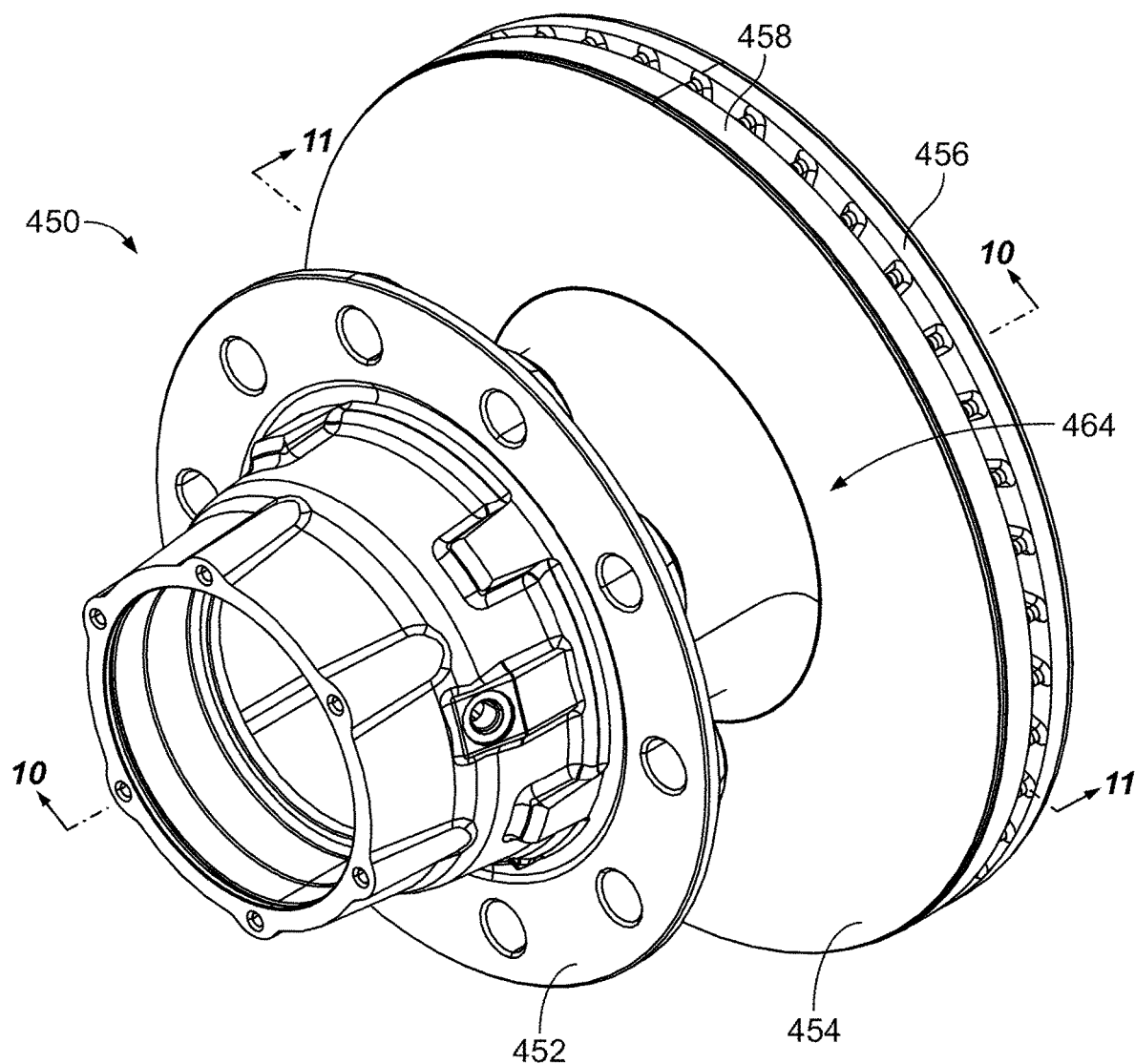
FIG. 8 is a perspective view of a wheel hub apparatus including a wheel hub and a rotor.
Figure 9:
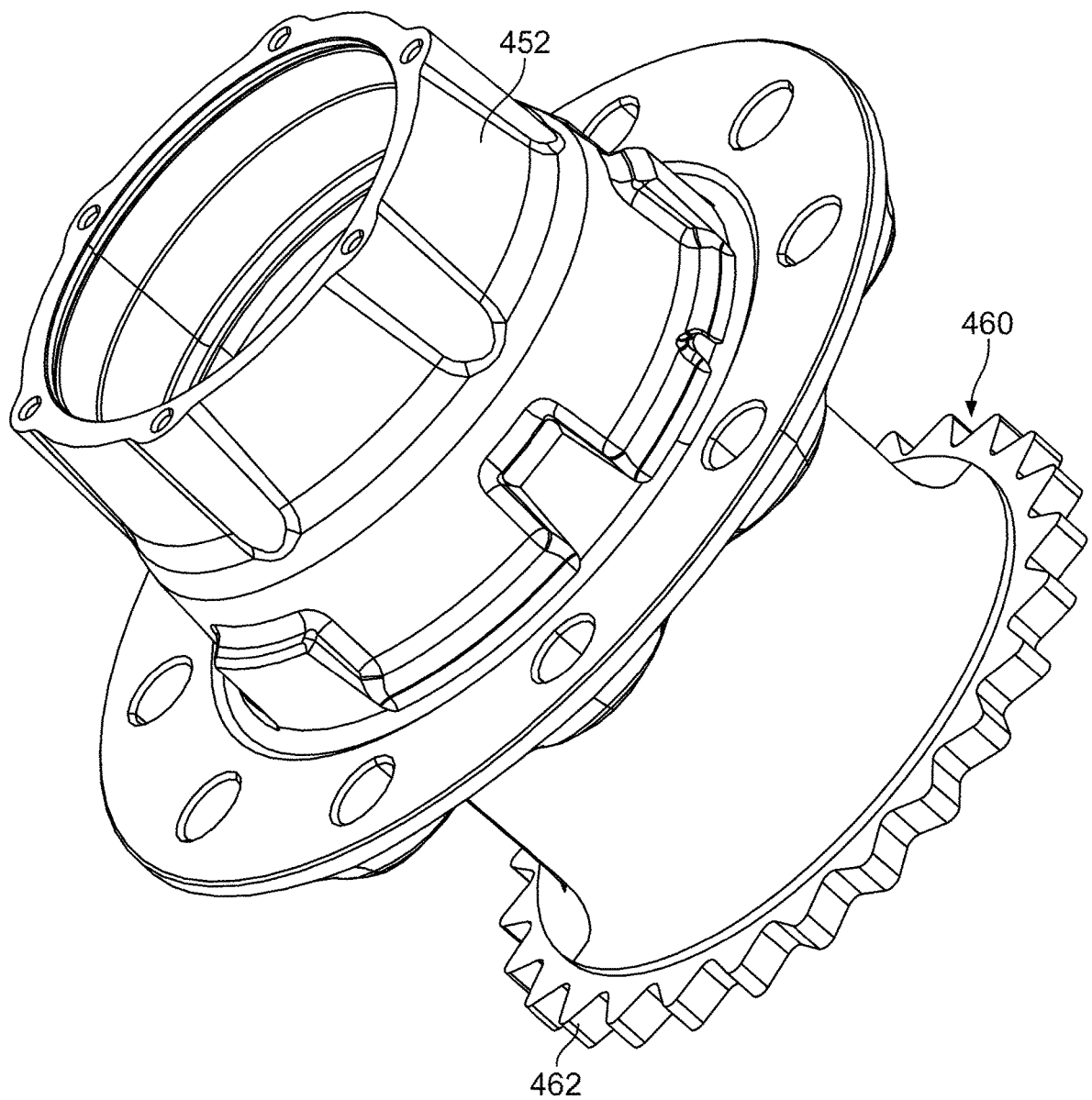
FIG. 9 is a perspective view of the wheel hub apparatus of FIG. 8 showing an end of the wheel hub having radially extending projections.
Figure 10:
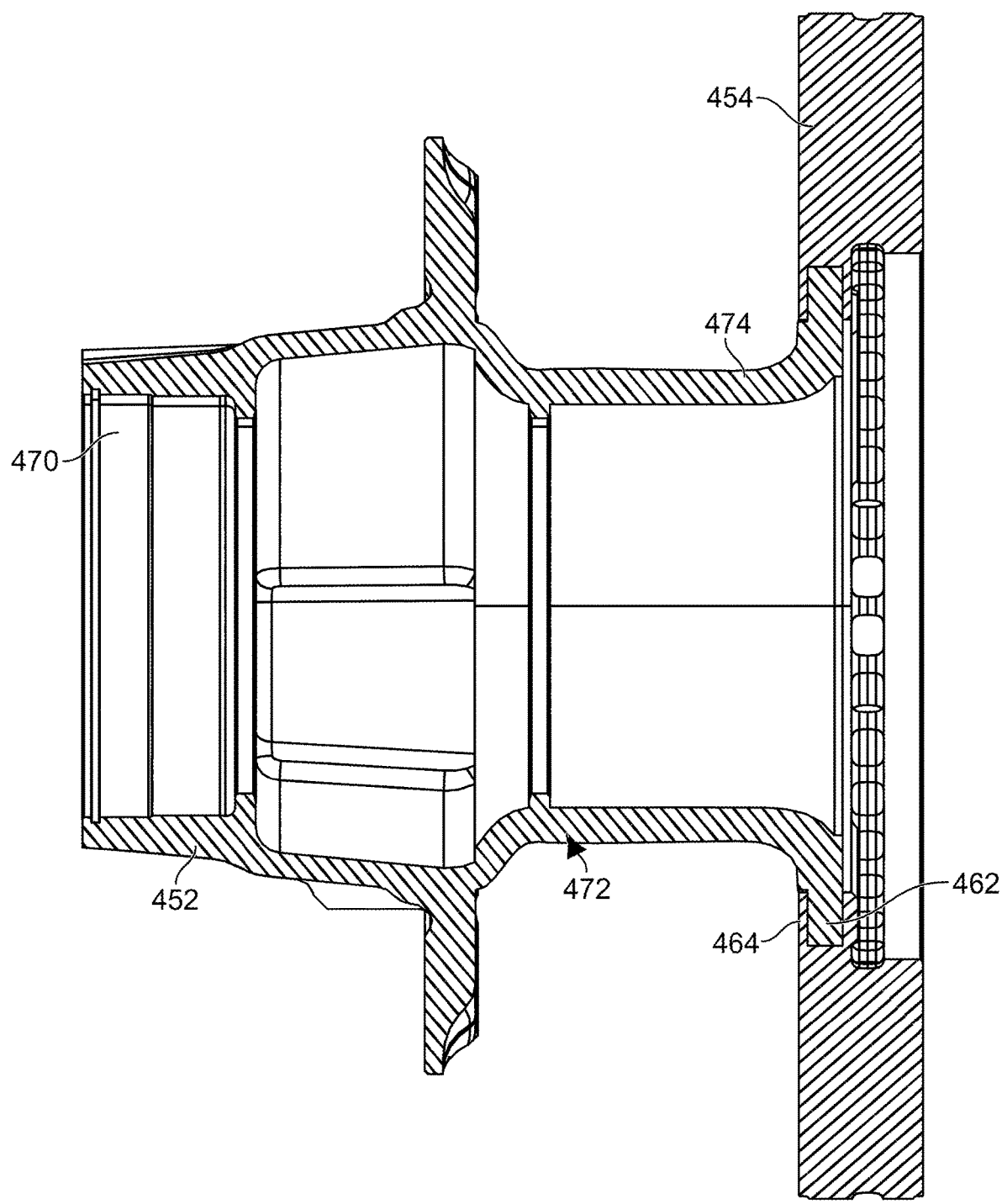
FIG. 10 is a cross-sectional view taken across line 10-10 in FIG. 8 showing the projections of the wheel hub received in recesses of the rotor.
Figure 11:
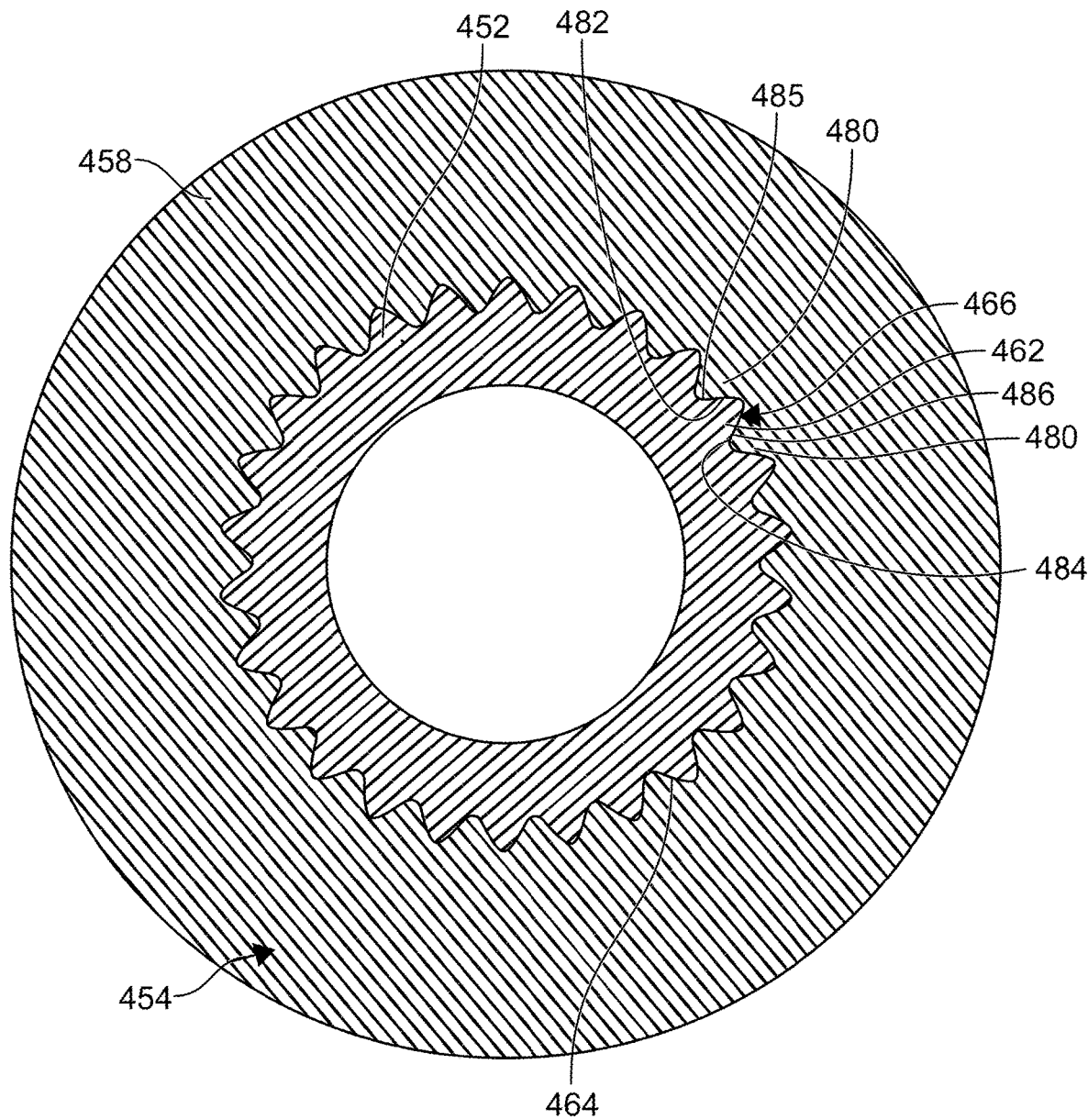
FIG. 11 is a cross-sectional view taken across line 11-11 in FIG. 8 showing the projections of the wheel hub intermeshed with projections of the rotor to secure the rotor relative to the wheel hub.

Regarding FIG. 8, a wheel hub apparatus 450 is provided that is similar in many respects to the wheel hub apparatuses discussed above. The wheel hub apparatus 450 includes a wheel hub 452 and a rotor 454. The rotor 454 includes an inboard braking portion 456 and a thicker, outboard braking portion 458. Regarding FIGS. 8 and 9, the wheel hub 452 includes a connecting portion 460 having projections, such as teeth 462, that engage a recess 464 of the outboard braking portion 458. Regarding FIG. 10, the wheel hub 452 includes a through opening 470 and a side wall 472 extending thereabout. The side wall 472 includes a tubular portion 474 that flairs radially outward to the teeth 462. Regarding FIG. 11, the recess 464 of the rotor 454 includes gaps 466 and teeth 480. The gaps 466 of the rotor 454 receive the teeth 462 of the wheel hub 452. Each tooth 462 of the wheel hub 452 has inclined surfaces 482, 484 that abut inclined surfaces 485, 486 of the adjacent teeth 480 of the rotor 454. The meshed teeth 462, 480 resist relative circumferential movement of the wheel hub 452 and the rotor 454. In one embodiment, the inclined surfaces 485, 486 of the rotor teeth 480 may slide relative to the inclined surfaces 482, 484 of the wheel hub teeth 462 as the rotor 454 expands radially due to the heat produced during a braking operation and contracts radially after the braking operation. Further, the meshed teeth 462, 480 resist circumferential movement of the rotor 454 relative to the wheel hub 452 even when the rotor 454 is in a radially expanded configuration.

Figure 12:
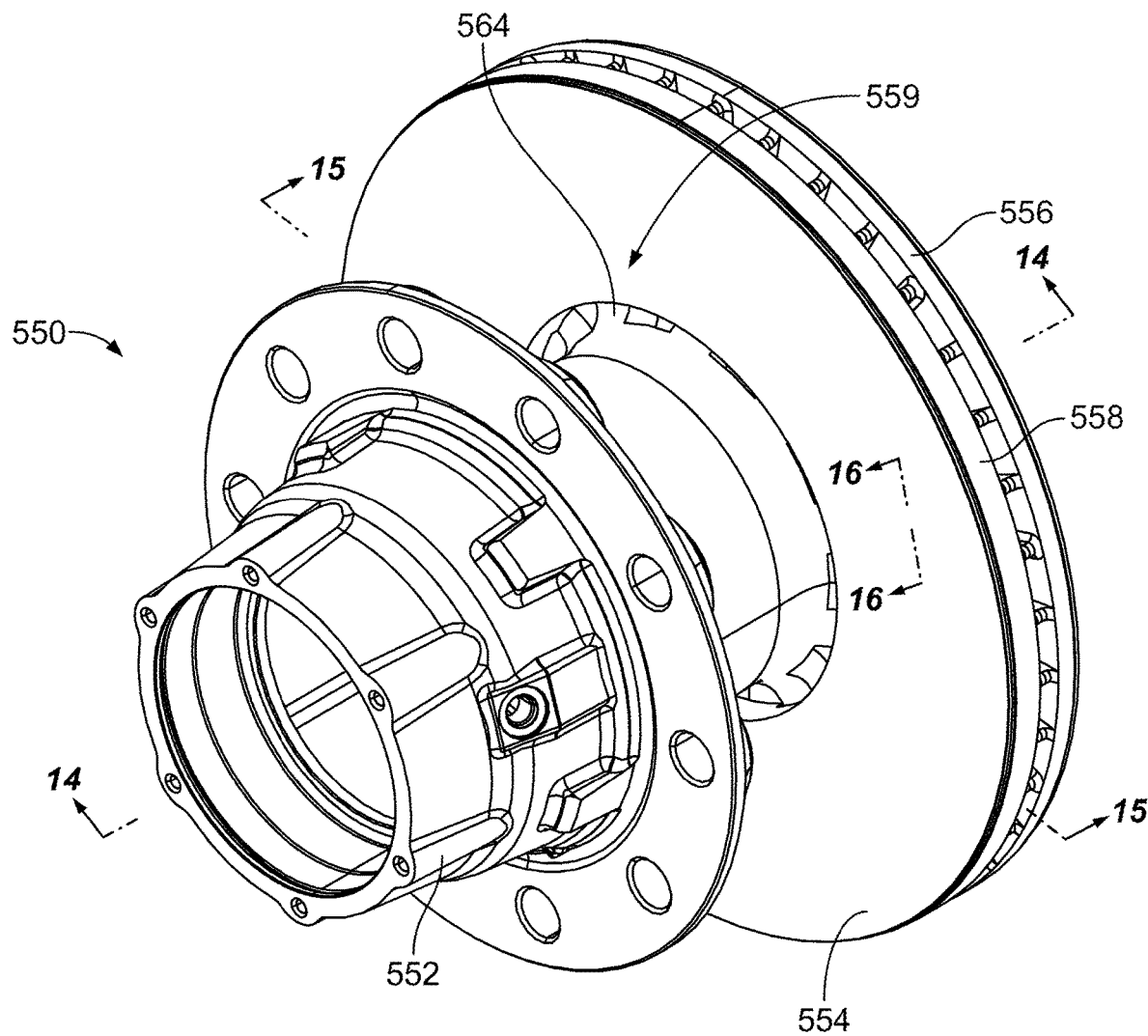
FIG. 12 is a perspective view of a wheel hub apparatus including a wheel hub and a rotor.
Figure 13:
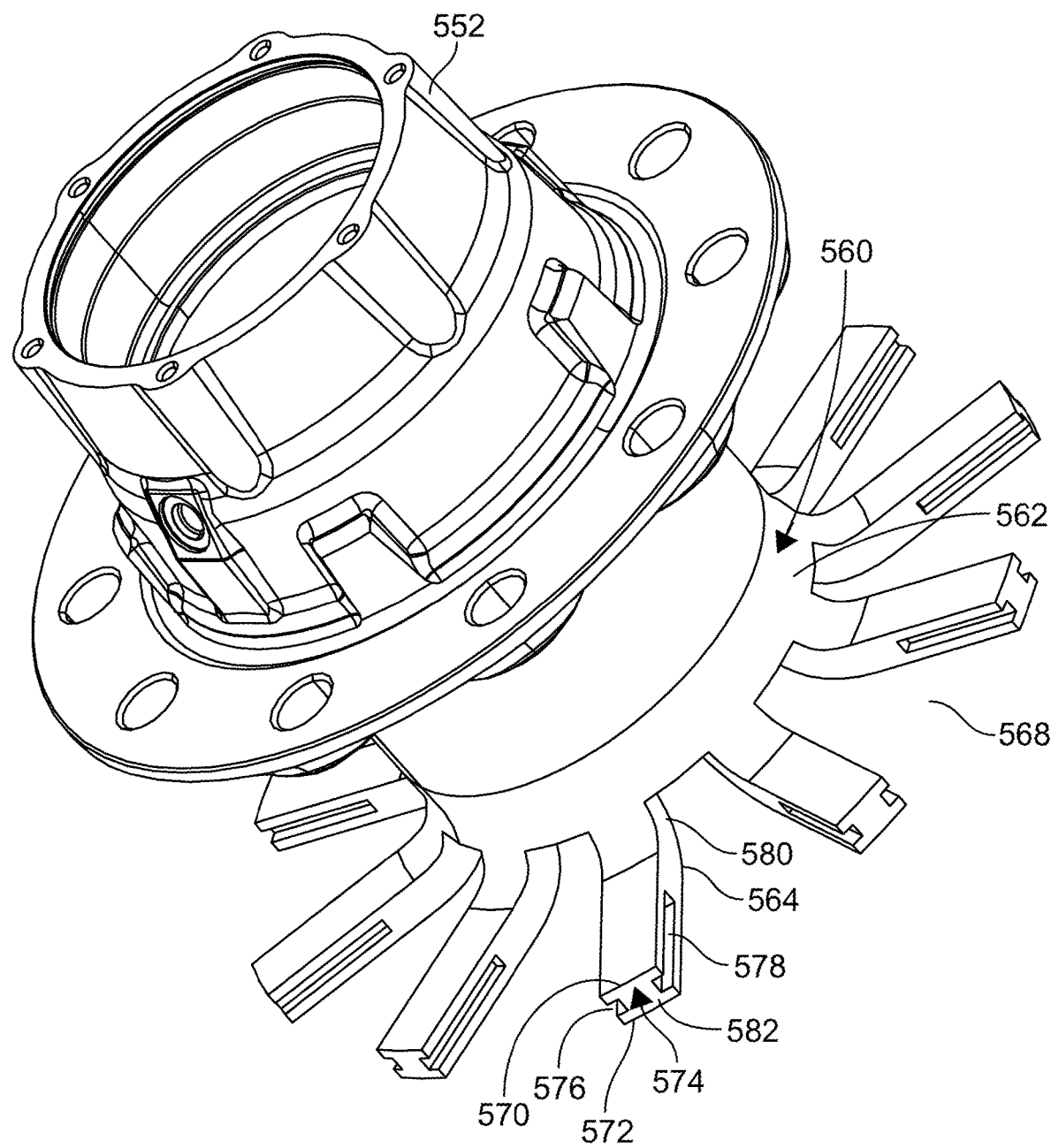
FIG. 13 is a perspective view of the wheel hub apparatus of FIG. 12 showing radially extending projections of the hub and grooves in the sides of the projections.

Regarding FIG. 12, a wheel hub apparatus 550 is provided that is similar in many respects to the wheel hub apparatuses discussed above. The wheel hub apparatus 550 includes a wheel hub 552 and a rotor 554. The rotor 554 includes an inboard braking portion 556 and outboard braking portion 558. Regarding FIG. 13, the wheel hub 552 has a connecting portion 560 including a tapered portion 562 and radially extending projections 564. The projections 564 of the wheel hub 552 are received in recesses 559 of the rotor 554. The projections 564 have circumferentially extending gaps 568 therebetween. In one embodiment, the projections 564 have a I-shaped cross-section taken perpendicular to the radial direction. For example, the projection 564 includes opposite enlarged portions 570, 572 and a narrow intermediate portion 574 therebetween. The projection 564 includes grooves 576, 578 extending along sides of the projection 564 between the enlarged portions 570, 572. The projection 564 includes a base portion 580 and a free end portion 582.

One difference between the wheel hub apparatus 550 and the wheel hub apparatuses discussed above is that the projections 564 are not fixed in the radial direction relative to the rotor 554. Instead, the wheel hub apparatus 550 includes slide connections 586 (see FIG. 14) between the projections 564 and the recesses 559 of the rotor 554. Regarding FIGS. 15 and 16, the recesses 559 of the rotor 554 each include a pair of guide walls 560, 562 having rail portions 561, 563. The rail portions 561, 563 contact straight sides 565, 566 of the intermediate portion 574 of the projection 564 and restrict relative movement of the projection 564 and the rotor 554 to radial movement in directions 571, 573.

Figure 16:
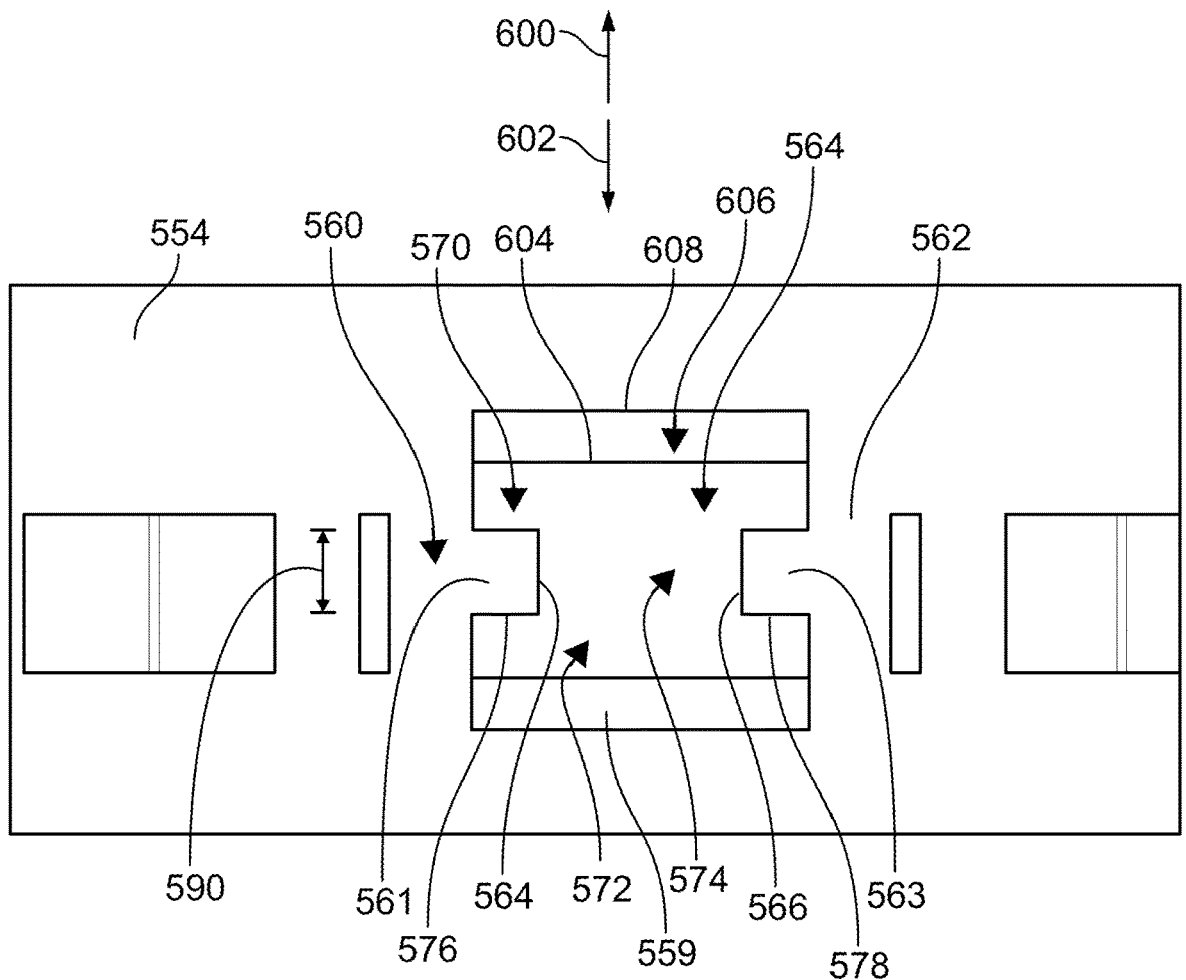
FIG. 16 is a cross-sectional view taken generally across line 16-16 in FIG. 12 showing one of the projections received in one of the recesses of the rotor and rails of the pair of guide walls of the rotor extending in the grooves of the projection of the wheel hub.

Regarding FIG. 16, the rail portions 561, 563 extend into the grooves 576, 578 of the projection 564. The wider enlarged portions 570, 572 of the projection 564 on either side of the rail portions 561, 563 resists axial movement in directions 600, 602 of the projection 564 relative to the rotor 554. Further, the rail portions 561, 563 have an axial thickness 590 sized to fit tightly within the grooves 576, 578 while permitting radial movement of the projection 564 in directions 570, 572.

Regarding FIG. 16, the enlarged portions 570, 572 of the wheel hub projection 564 each have an outer surface 604 separated by a gap 606 from a confronting surface 608 of the rotor 554. The gaps 606 permit airflow radially along the projection 564 which helps cool the rotor 554 and insulates the projection 564 from the rotor 554. Further, the gaps 606 reduce the contact area between the projection 564 and the rotor 554 which reduces heat transfer therebetween.

Figure 14:
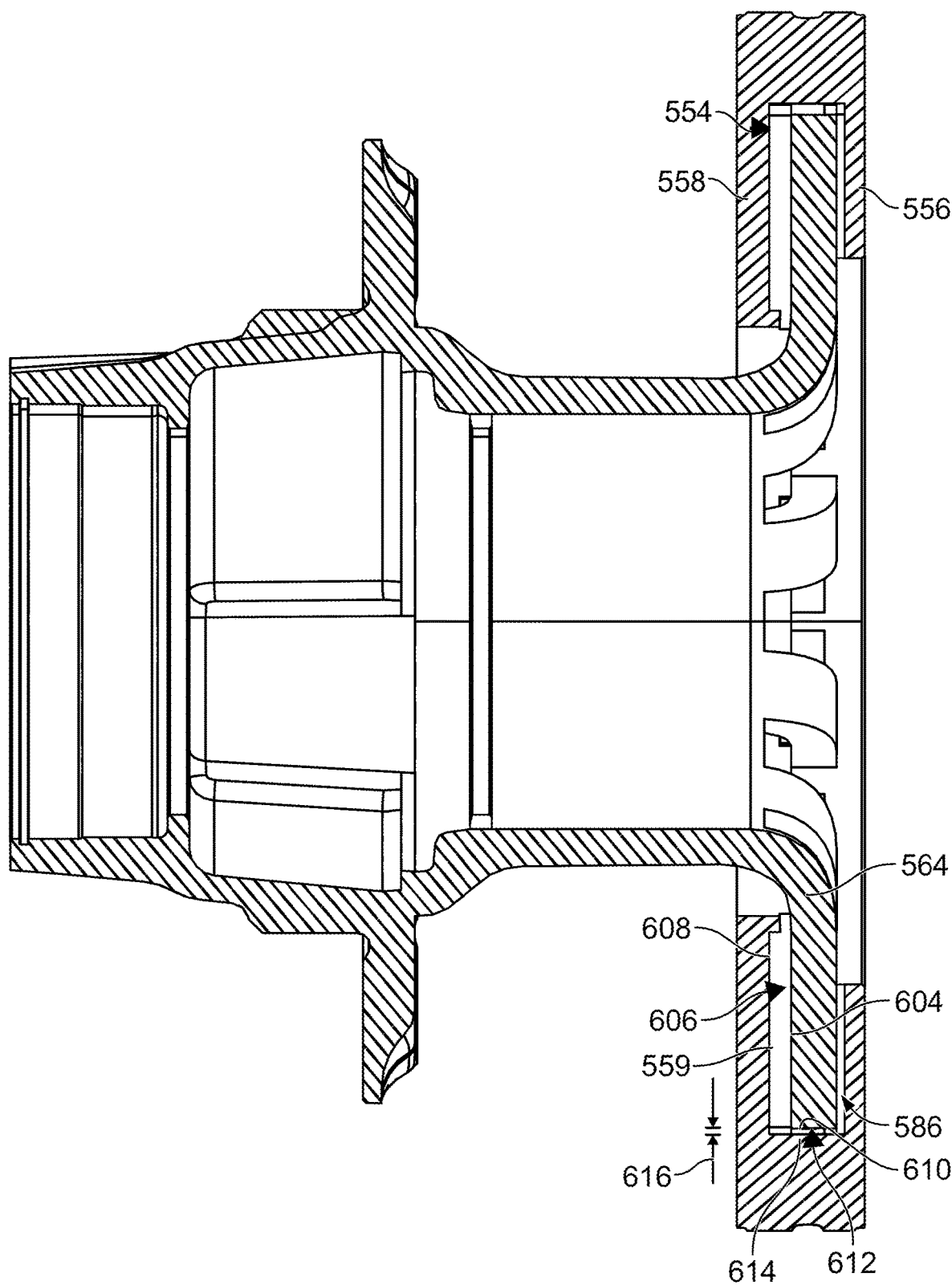
FIG. 14 is a cross-sectional view taken across line 14-14 in FIG. 12 showing the projections of the wheel hub slidably received in recesses of the rotor.
Figure 15:
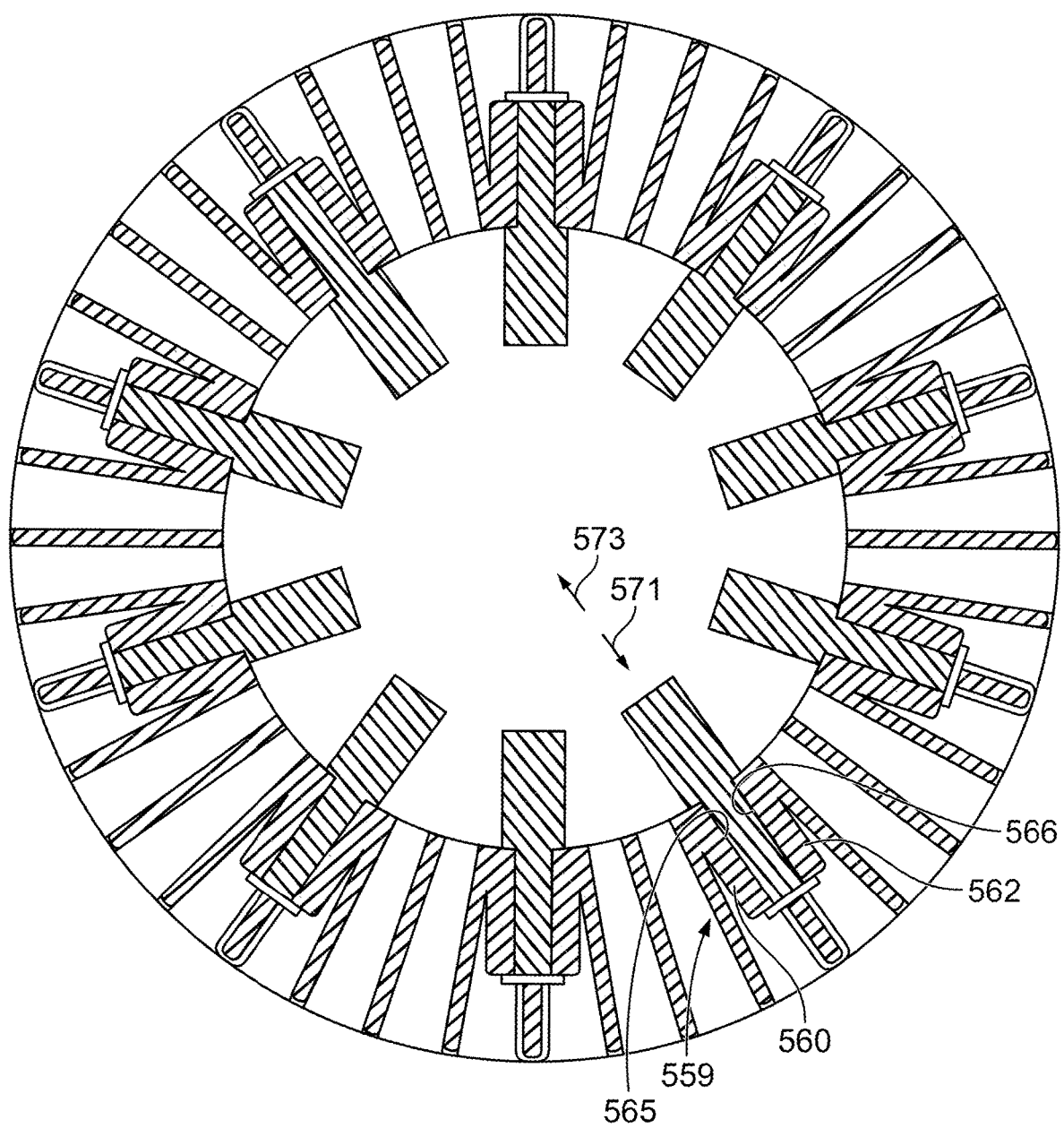
FIG. 15 is a cross-sectional view taken across line 15-15 in FIG. 12 showing a pair of guide walls of the rotor on opposite sides of each of the projections to guide relative movement between the projections and the rotor.

Regarding FIG. 14, each projection 564 has an end 610 spaced by a gap 612 from a wall 614 of the recess 559 of the rotor 554. The gap 612 may have a distance 616 sized to permit relative movement of the rotor 554 as the rotor 554 expands and contracts during operation of the vehicle.

Figure 17:
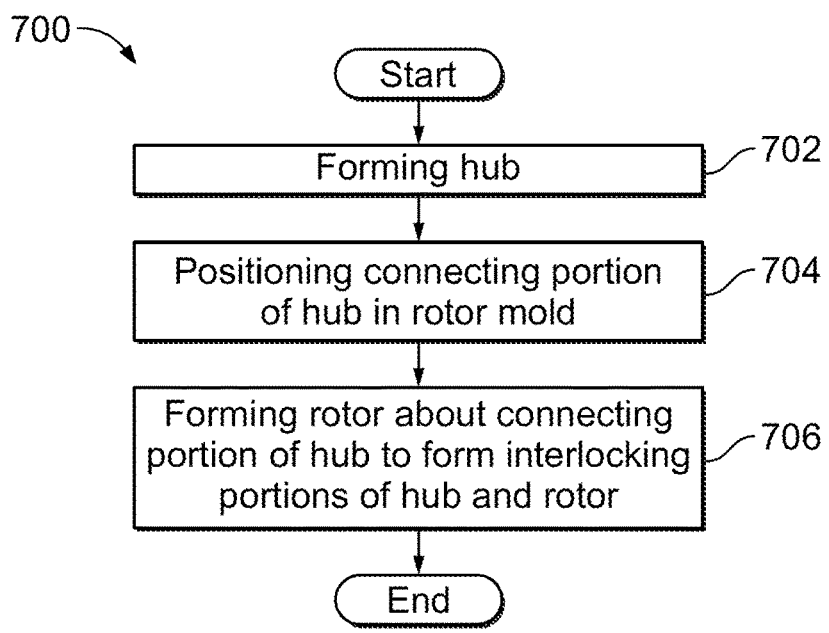
FIG. 17 is a flowchart of an example method of producing a wheel hub apparatus.

With reference to FIG. 17, a method 700 is provided for producing a wheel hub apparatus, such as the wheel hub apparatus 10. The method 700 includes forming 702 a hub, such as the wheel hub 12 discussed above. The forming 702 may include, for example, casting the wheel hub 12 using a first mold.

The method 700 includes positioning 704 a connecting portion of the wheel hub in a rotor mold. For example, the positioning 702 may include positioning the foot portions 92 of the wheel hub 12 in a second mold for the rotor 14. It will be appreciated that if a single mold is used to mold the wheel hub 12 and rotor 14, the operations 702, 704 will performed in the same mold.

The method 700 further includes forming 706 the rotor about the connecting portion of the wheel hub to form interlocking portions of the wheel hub and rotor. The interlocking portions of the wheel hub and rotor fix the rotor to the wheel hub. As one example, the rotor 14 may be cast about the projections 34 of the wheel hub 12 so that retainers 160 are formed about and in interlocking engagement with the enlarged head portions 150 of the projections 34. With the enlarged portions 150 of the projections 34 in the recesses 36 of the retainers 160, the rotor 14 is fixed against radial and circumferential movement relative to the enlarged portions 150.

Figure 18:
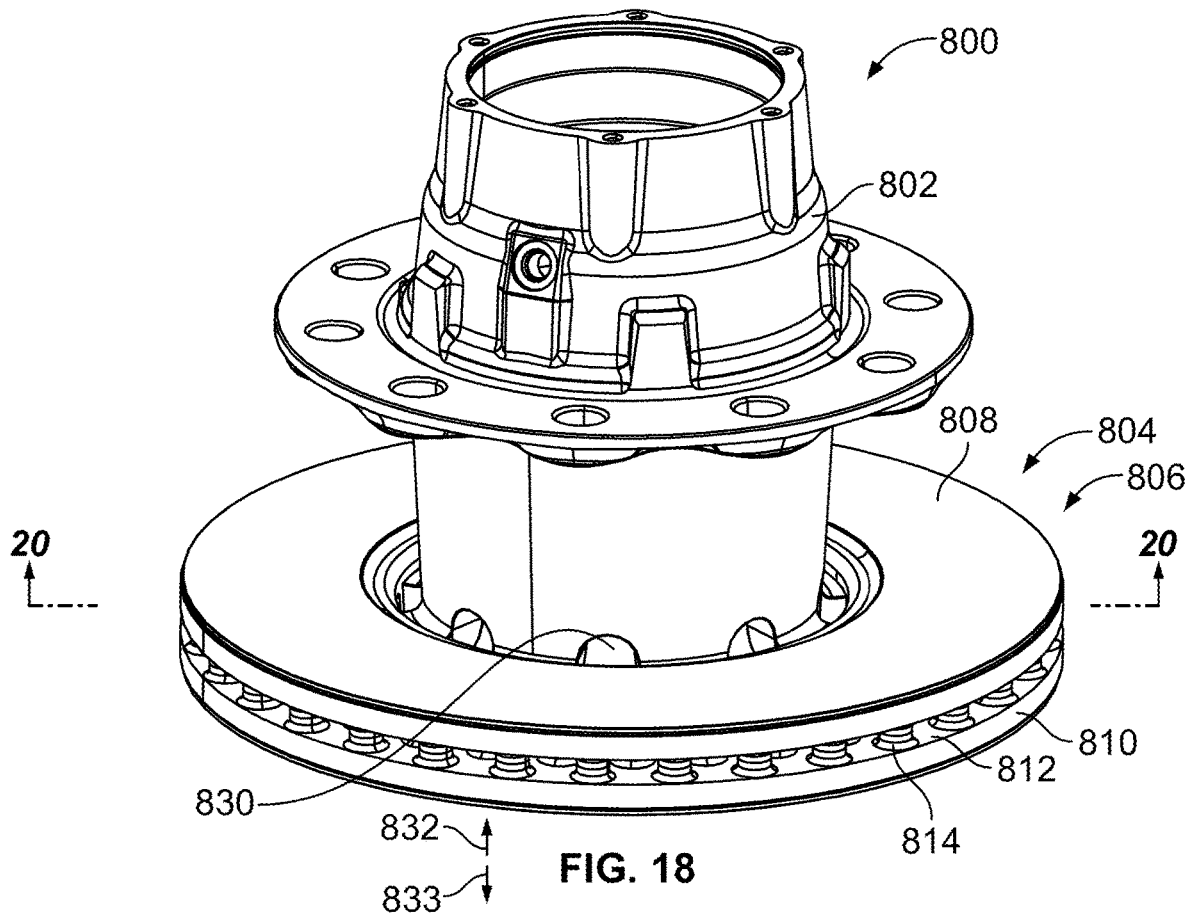
FIG. 18 is a perspective view of a wheel hub apparatus including a wheel hub and an integrated brake rotor.
Figure 19:
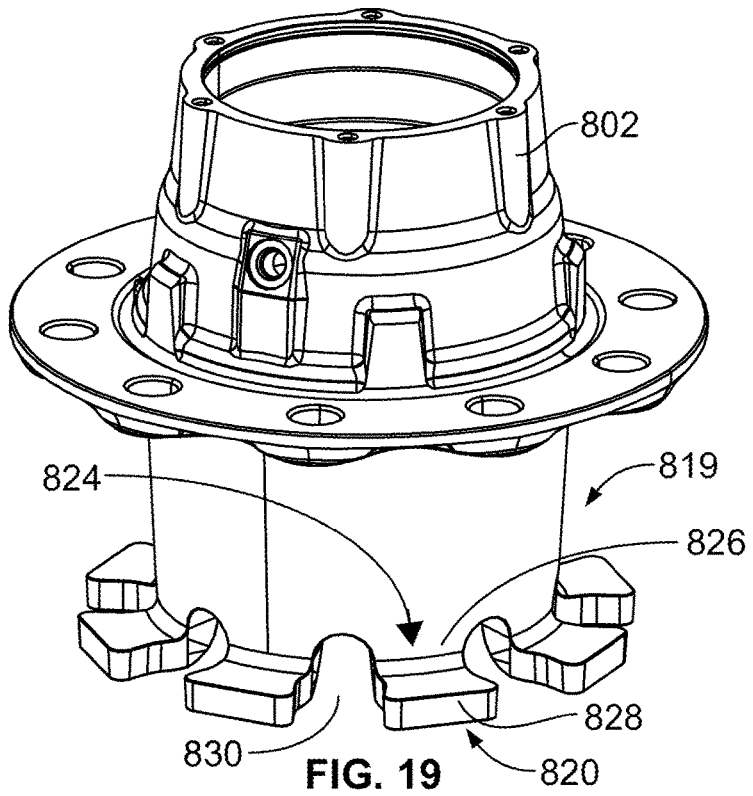
FIG. 19 is a perspective view of the wheel hub of FIG. 18 with the rotor removed to show projections of the wheel hub.

Regarding FIGS. 18 and 19, a wheel hub apparatus 800 is provided that is similar in many respects to the wheel hub apparatuses discussed above such that differences will be highlighted. The wheel hub apparatus 800 includes a wheel hub 802 and a rotor 804. The rotor 804 includes a braking portion 806 having an outboard braking portion 808, an inboard braking portion 810, vents 812 and pin vanes 814. The wheel hub 802 includes a connecting portion 819 having one or more projections 820 that engage corresponding recesses 822 of the brake rotor 804.

Regarding FIG. 19, the projections 820 include a base portion 824, a leg portion 826, and a foot portion 828. The connecting portion 819 has openings 830 between the projections 820 that remove material from the wheel hub 802 and increase the flexibility of the projections 820. Additionally, the openings 830 permit air flow in direction 832 across the brake rotor 804 as well as into a radial gap 834 (see FIG. 20) between the wheel hub 802 and the rotor 804. Regarding FIG. 20, the air flow may travel from gap 834 into vents of the rotor 804 along a path 836 between the pin vanes 814 which improves air flow into the brake rotor 804.

Figure 20:
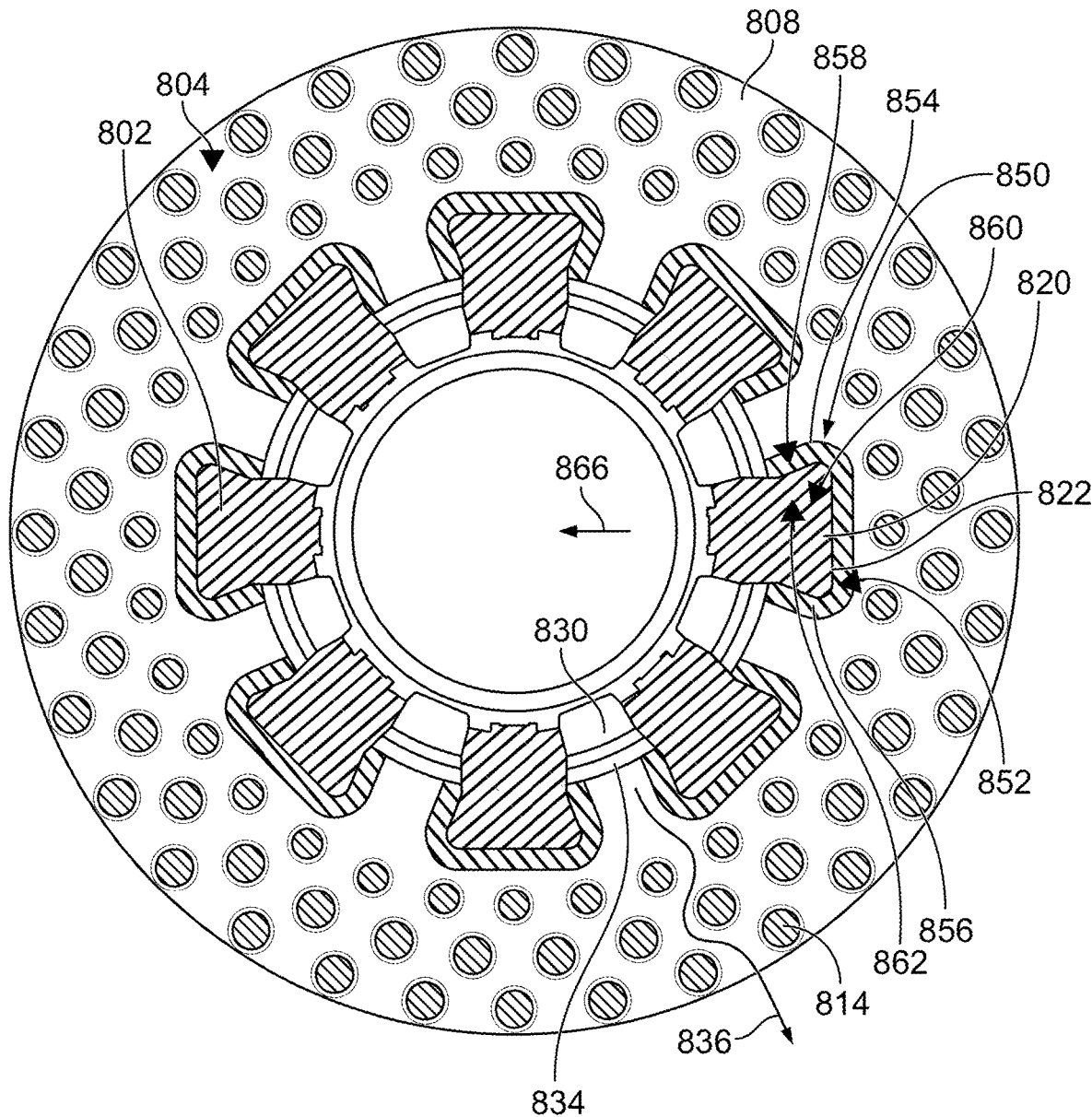
FIG. 20 is a cross-sectional view taken across line 20-20 in FIG. 18 showing enlarged portions of the wheel hub projections received in recesses of the rotor which fix the rotor to the wheel hub.

Regarding FIG. 20, the rotor 804 includes retainers 850 of the recesses 822 that include a C-shaped wall 852 with angled wall portions 854, 856 that form a neckdown portion 858. The projection 820 includes an enlarged portion 860 and a narrow portion 862 extending in the neckdown portion 858. The wall portions 854, 856 confront with sides of the projection 820 to resist pull-through of the projection 820 in direction 866. The mating projection 820 and C-shaped wall 852 inhibit radial and rotational relative movement between the projection 820 and the rotor 804. Further, the base portion 824 and/or the leg portion 826 of the projection 820 may bend or flex to accommodate radial expansion and contraction of the rotor 804 during operation of the vehicle.

Figure 21:
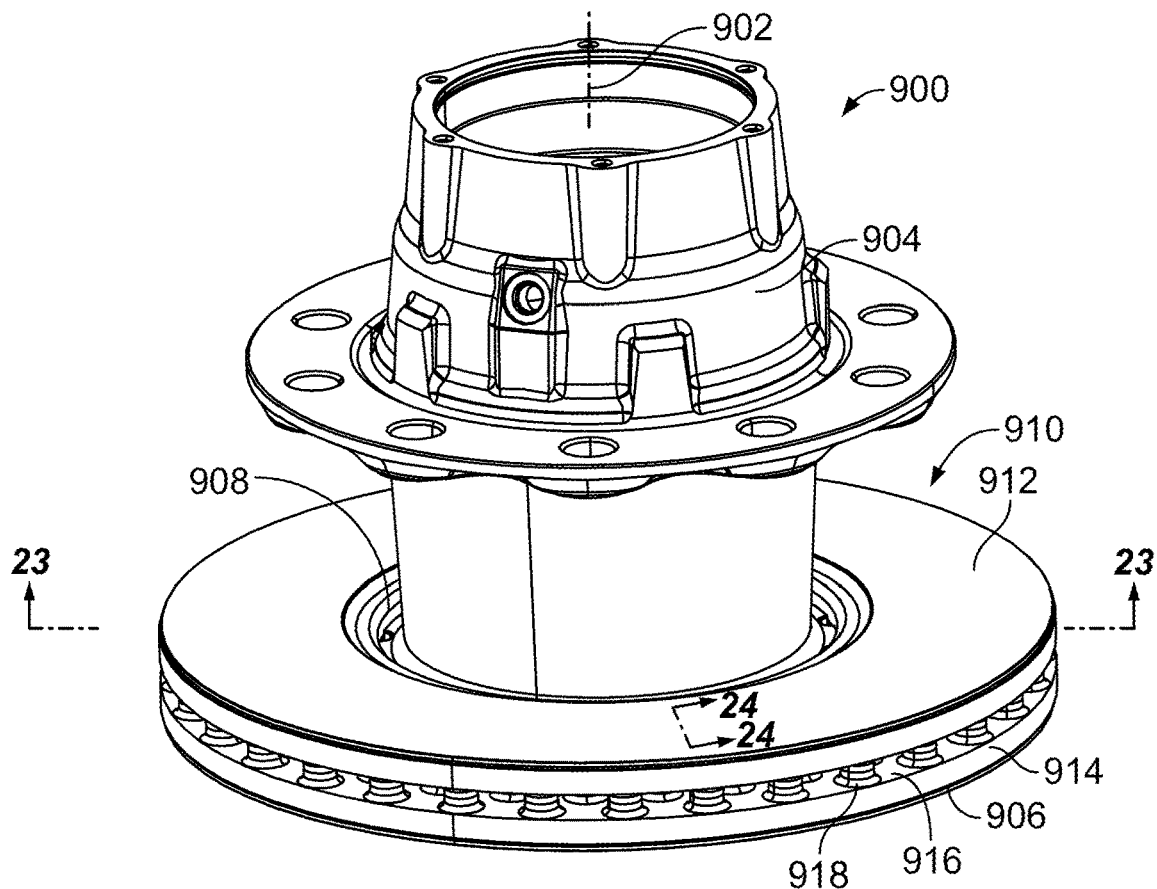
FIG. 21 is a perspective view of a wheel hub apparatus including a wheel hub and an integrated brake rotor.
Figure 22:
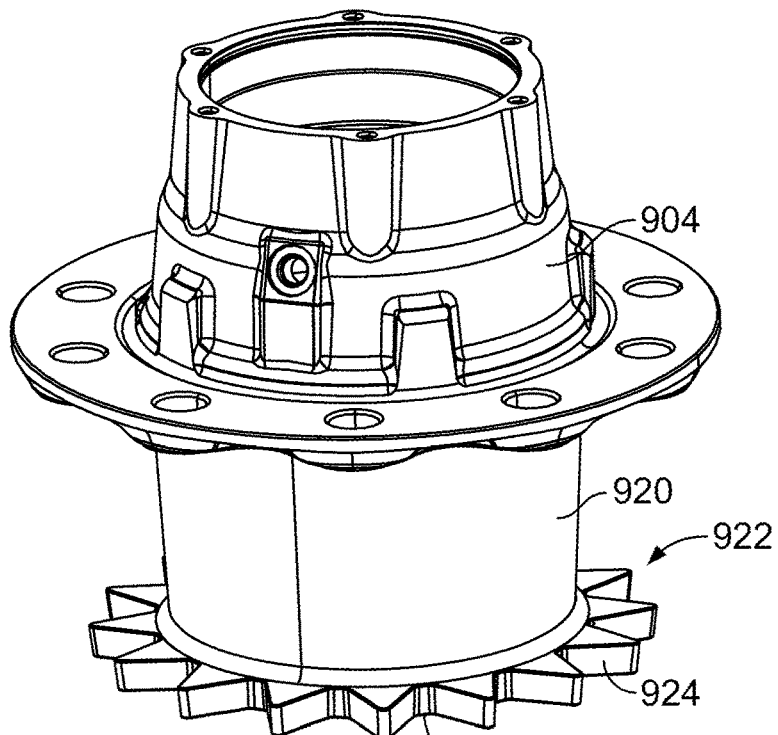
FIG. 22 is a perspective view of the wheel hub of FIG. 21 showing teeth of the wheel hub.

Regarding FIGS. 21 and 22, a wheel hub apparatus 900 is provided that is rotatable around an axis 902 and includes a hub 904 and a brake rotor 906. Brake rotor 906 includes a mounting flange 908 and a braking portion 910. Braking portion 910 includes an outboard braking portion 912, an inboard braking portion 914, vents 916, and pin vanes 918. Regarding FIG. 22, the wheel hub 904 includes a tubular wall 920 and a connecting portion 922. The connecting portion 922 includes teeth 924 and lands 926 between the teeth 924.

Figure 23:
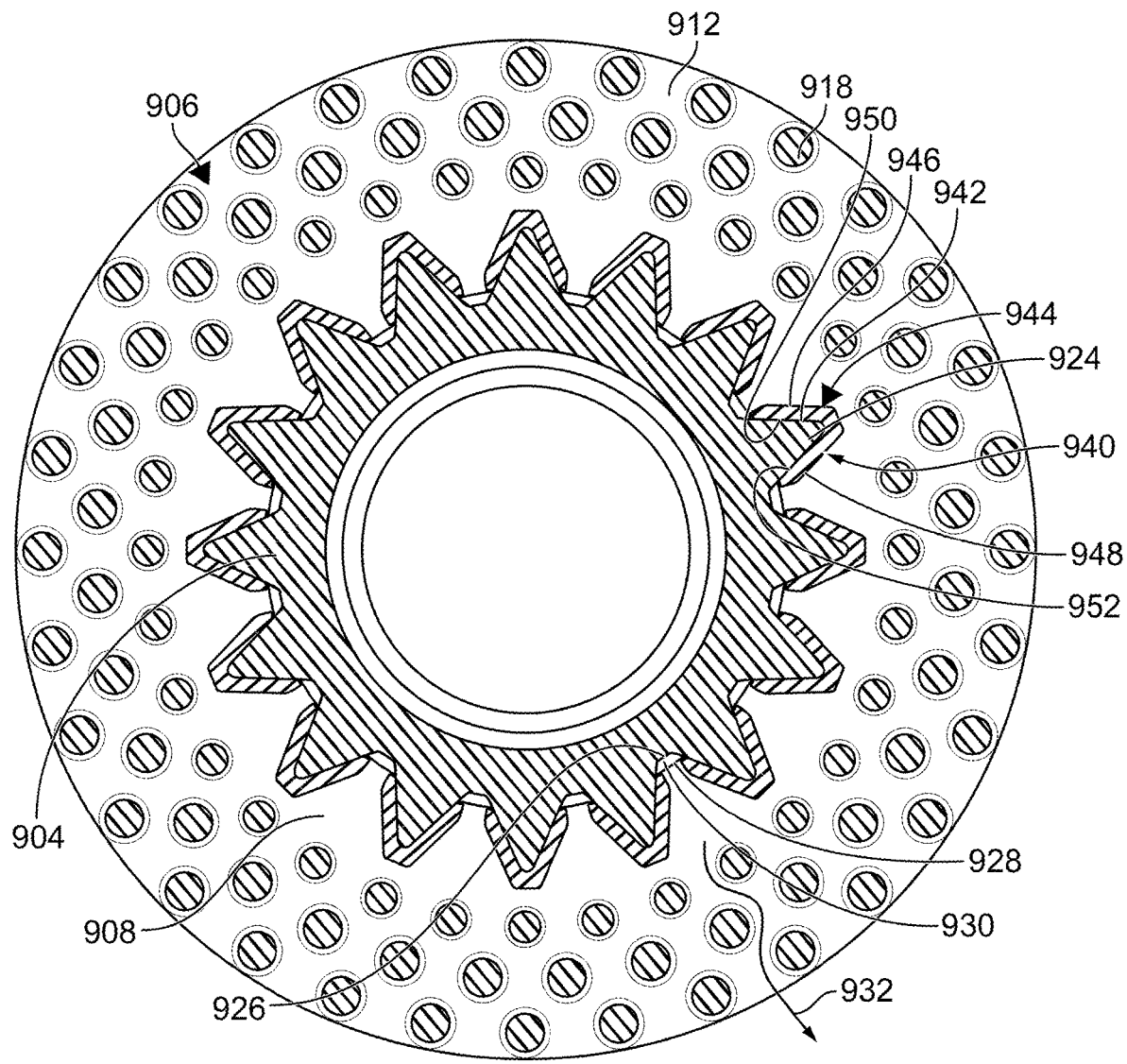
FIG. 23 is a cross-sectional view taken across line 23-23 in FIG. 21 showing the teeth of the wheel hub received in recesses of the brake rotor.

Regarding FIG. 23, the rotor 906 includes a radially inner surface 928 of the mounting flange 908 that is spaced from the land 926 of the wheel hub 904 to form a radial gap or opening 930. The openings 930 permit air to flow axially into the openings 930 from an inboard or outboard side of the rotor 906, into vents of the rotor 906, and along paths 932 between the pin vanes 918. This permits the air flow to cool the undersides of the inboard and outboard braking portions 912, 914 using air from both inboard and outboard sides of the rotor 906.

Regarding FIG. 23, the rotor 906 includes retainers 940 of recesses 942 for receiving the teeth 924. The retainers 940 each include a V-shaped wall 944 having transversely extending wall portions 946, 948 that are engaged with the incline surfaces 950, 952 of the respective tooth 924.

Figure 24:
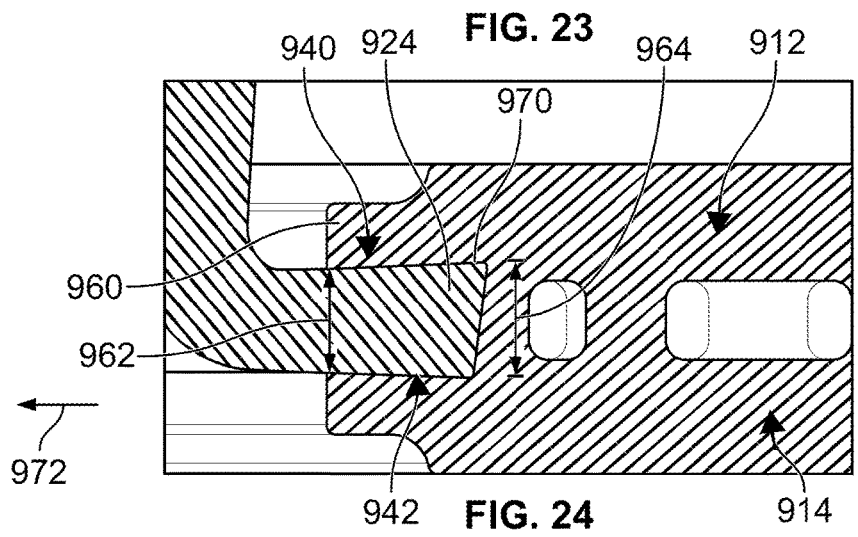
FIG. 24 is a cross-sectional view taken across line 24-24 in FIG. 22 showing an enlarged portion of one of the teeth that fixes the tooth within a mounting flange of the rotor.

Regarding FIG. 24, the retainer 940 further includes a neckdown portion 960 that forms an opening with a height 962 that is less than a height 964. Because the opening formed by the neckdown portion 960 is shorter than the height 964 of an enlarged distal portion 970 of the tooth 924, the neckdown portion 960 inhibits shifting of the tooth 924 radially inward in direction 972. In this manner, the tooth 924 is fixed relative to the rotor 906. In another embodiment, such as the embodiment of FIG. 9, the teeth of the wheel hub may be flat rather than having an enlarged distal portion.

Figure 25:
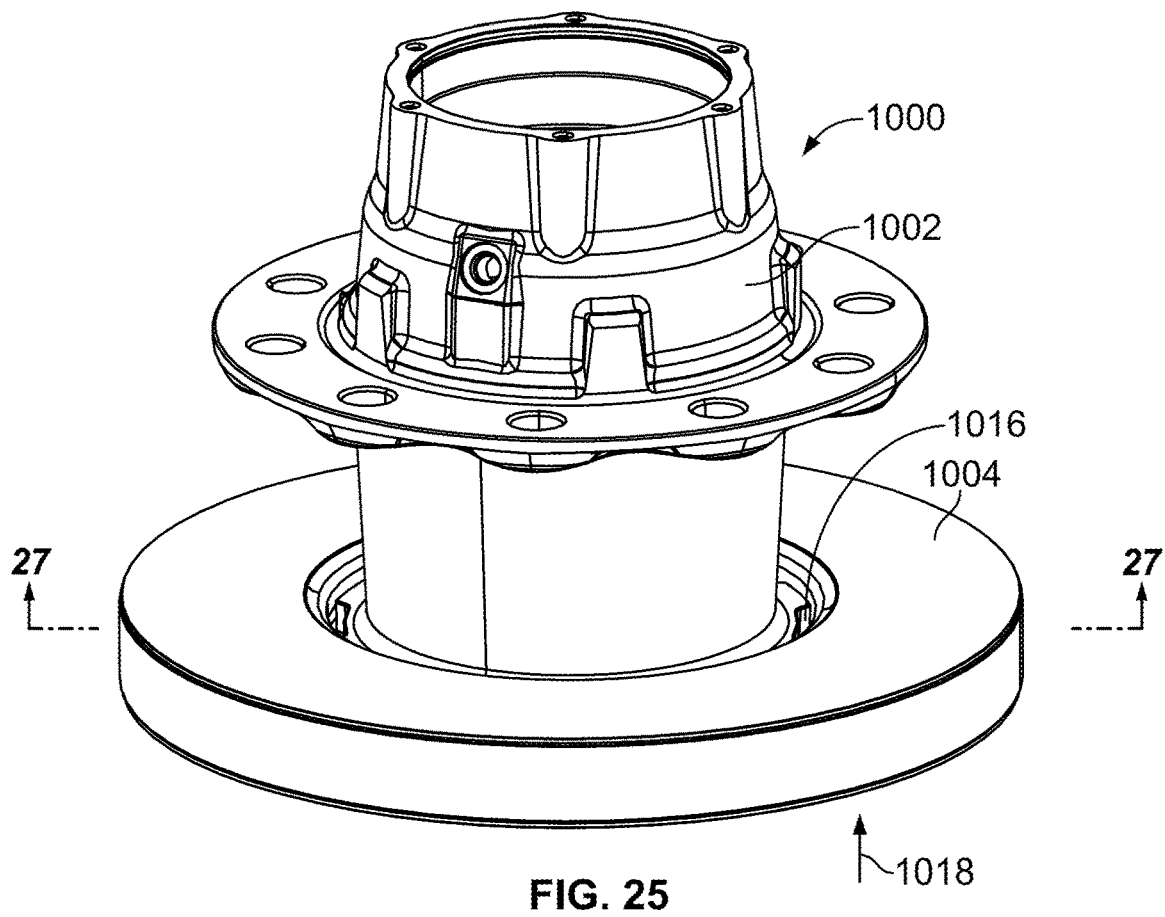
FIG. 25 is a perspective view of a wheel hub apparatus including a wheel hub and an integrated solid brake rotor.
Figure 26:
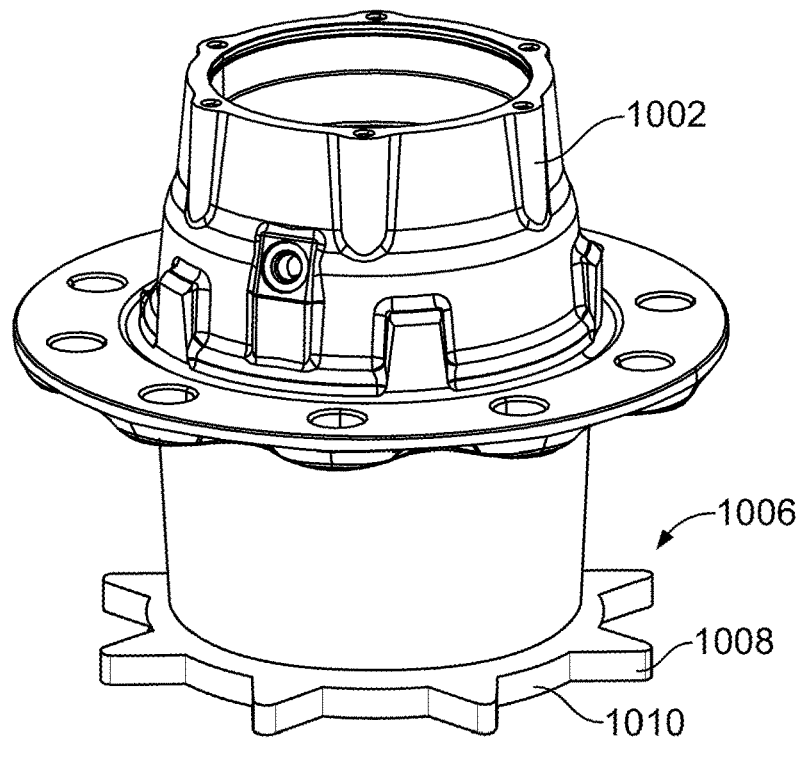
FIG. 26 is a perspective view of the wheel hub of FIG. 25 showing teeth of the wheel hub.

Regarding FIG. 25, a wheel hub apparatus 1000 is provided that includes a wheel hub 1002 and a rotor 1004 that is solid rather than having vents. Regarding FIG. 26, the wheel hub 1002 includes a connecting portion 1006 with teeth 1008 and lands 1010 separating the teeth 1008.

Figure 27:
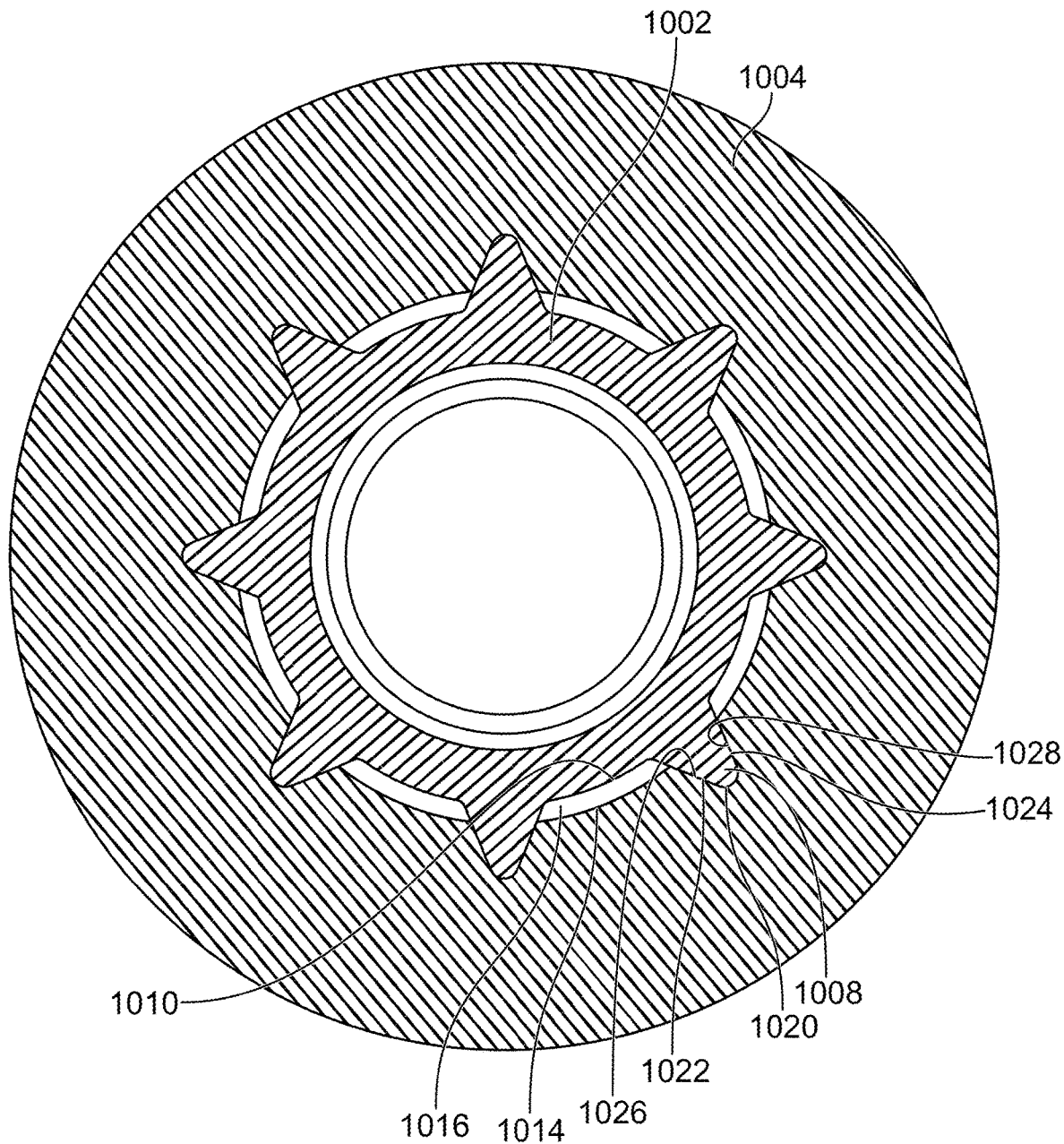
FIG. 27 is a cross-sectional view taken across line 27-27 in FIG. 25 showing teeth of the wheel hub engaged in recesses of the rotor.

Regarding FIG. 27, the rotor 1004 has a radially inner surface 1014 separated by a gap from the lands 1010 to form a radial gap or opening 1016 therebetween. The openings 1016 permit air to flow in an outboard direction 1018 (see FIG. 25) from an inboard side of the rotor 1004 to the outboard side to cool the rotor 1004.

Regarding FIG. 27, the rotor 1004 includes recesses 1020 that receive the teeth 1008 of the wheel hub 1002. The recesses 1020 each include inclined surfaces 1022, 1024 that mate with surfaces 1026, 1028 of the associated tooth 1008.

The surfaces 1022, 1024 may slide along the surfaces 1026, 1028 as the rotor 1004 expands and contracts during operation of the vehicle.

Figure 28:
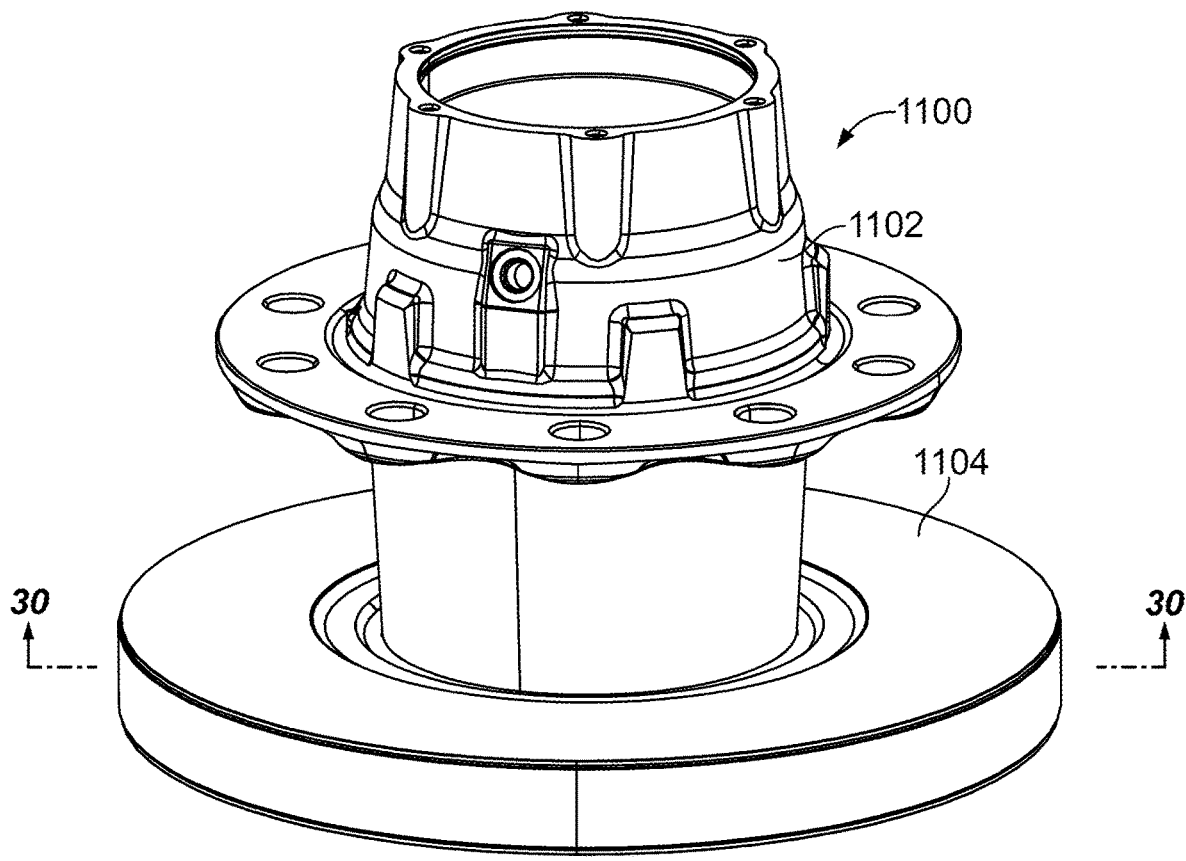
FIG. 28 is a perspective view of a wheel hub apparatus including a wheel hub and an integrated solid brake rotor.
Figure 29:
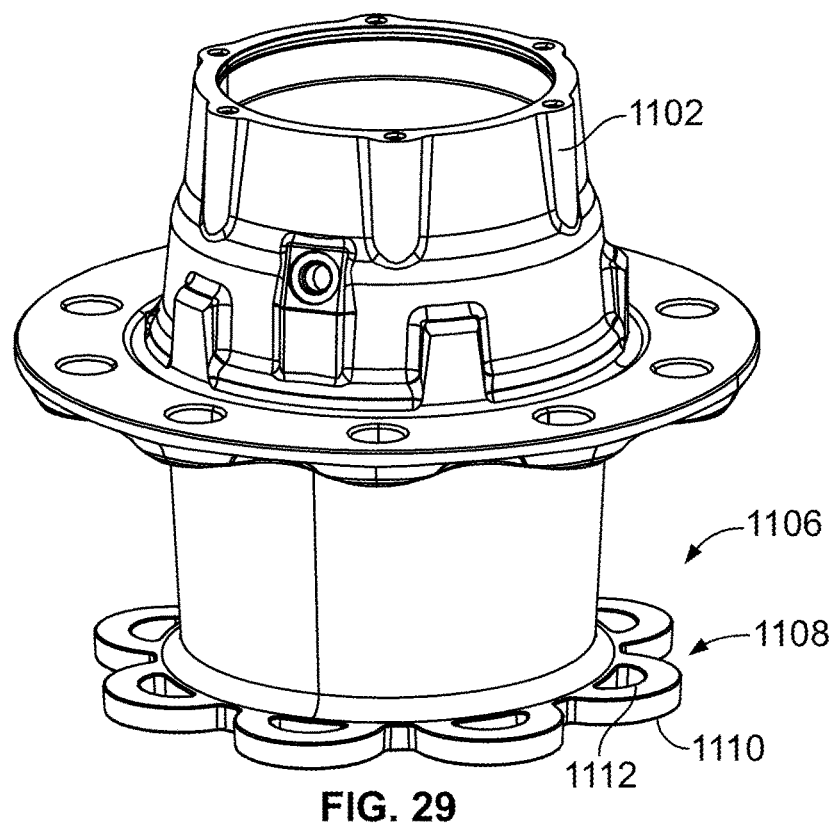
FIG. 29 is a perspective view of the hub of FIG. 28 showing loops of the wheel hub.
Figure 30:
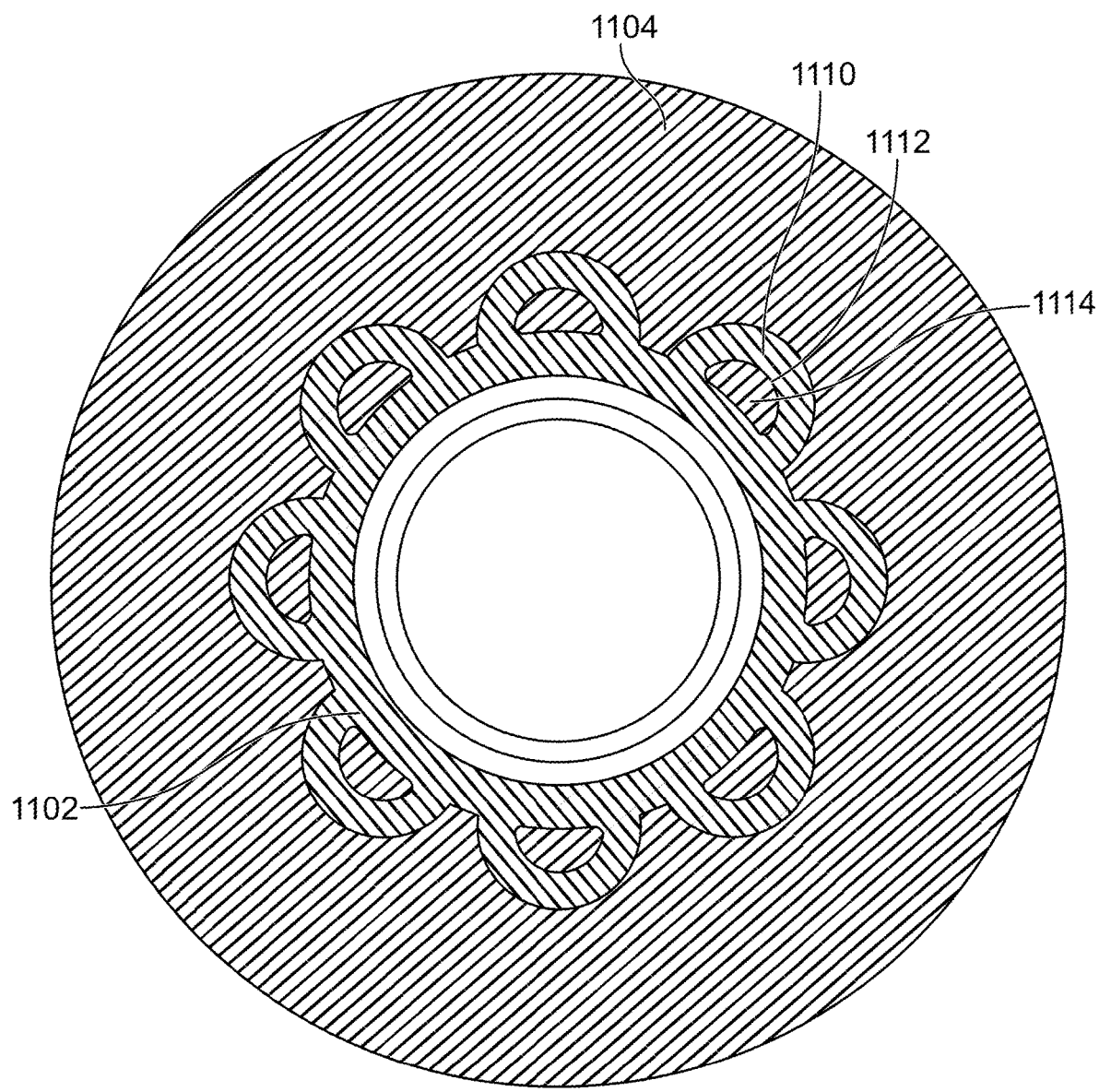
FIG. 30 is a cross-sectional view taken across line 30-30 in FIG. 28 showing portions of the rotor extending through openings of the loops of the wheel hub to fix the rotor to the wheel hub.

Regarding FIGS. 28 and 29, a wheel hub apparatus 1100 is provided that is similar in many respects to the wheel hub apparatuses discussed above such that differences will be highlighted. The wheel hub apparatus 1100 includes a wheel hub 1102 and a solid rotor 1104. The wheel hub 1102 has a connecting portion 1106 with projections 1108 including loops 1110 having openings 1112. The rotor 1104 is formed in situ on the connecting portion 1106 of the wheel hub 1102 which includes forming recesses of the rotor 1104 which include retainers 1114 of the rotor 1104. The retainer 1114 extends through an opening 1112 of an associated loop 1110. The engagement between the retainers 1114 and the loops 1110 fixes the rotor 1104 to the wheel hub 1102.

Figure 31:
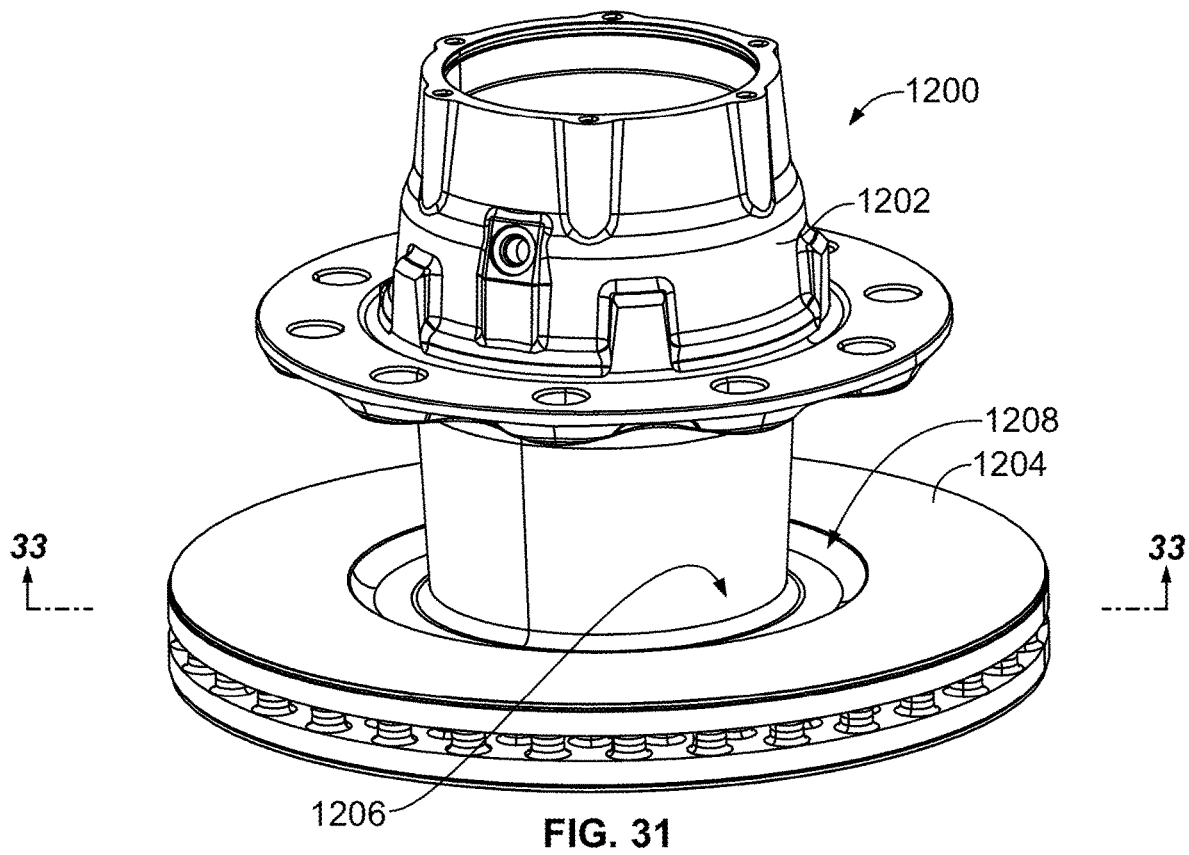
FIG. 31 is a perspective view of a wheel hub apparatus including a wheel hub and an integrated brake rotor having pin vanes.
Figure 32:
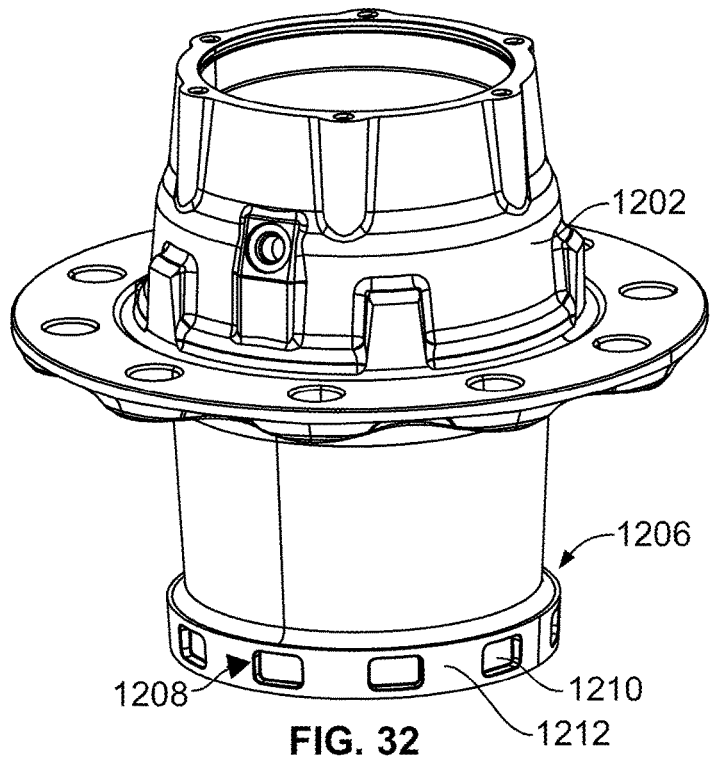
FIG. 32 is a perspective view of the wheel hub of FIG. 31 showing recesses of the hub.

Regarding FIGS. 31 and 32, a wheel hub apparatus 1200 is provided that is similar in many respects to the wheel hub apparatuses discussed above such that differences will be highlighted. The wheel hub apparatus 1200 includes a wheel hub 1202 and a rotor 1204. The wheel hub 1202 includes a connecting portion 1206 and the rotor 1204 includes a connecting portion such as a mounting flange 1208. Regarding FIG. 32, the connecting portion 1206 of the wheel hub 1202 includes a flange 1208 having recesses 1210 alternating with lands 1212 around the flange 1208.

Figure 33:
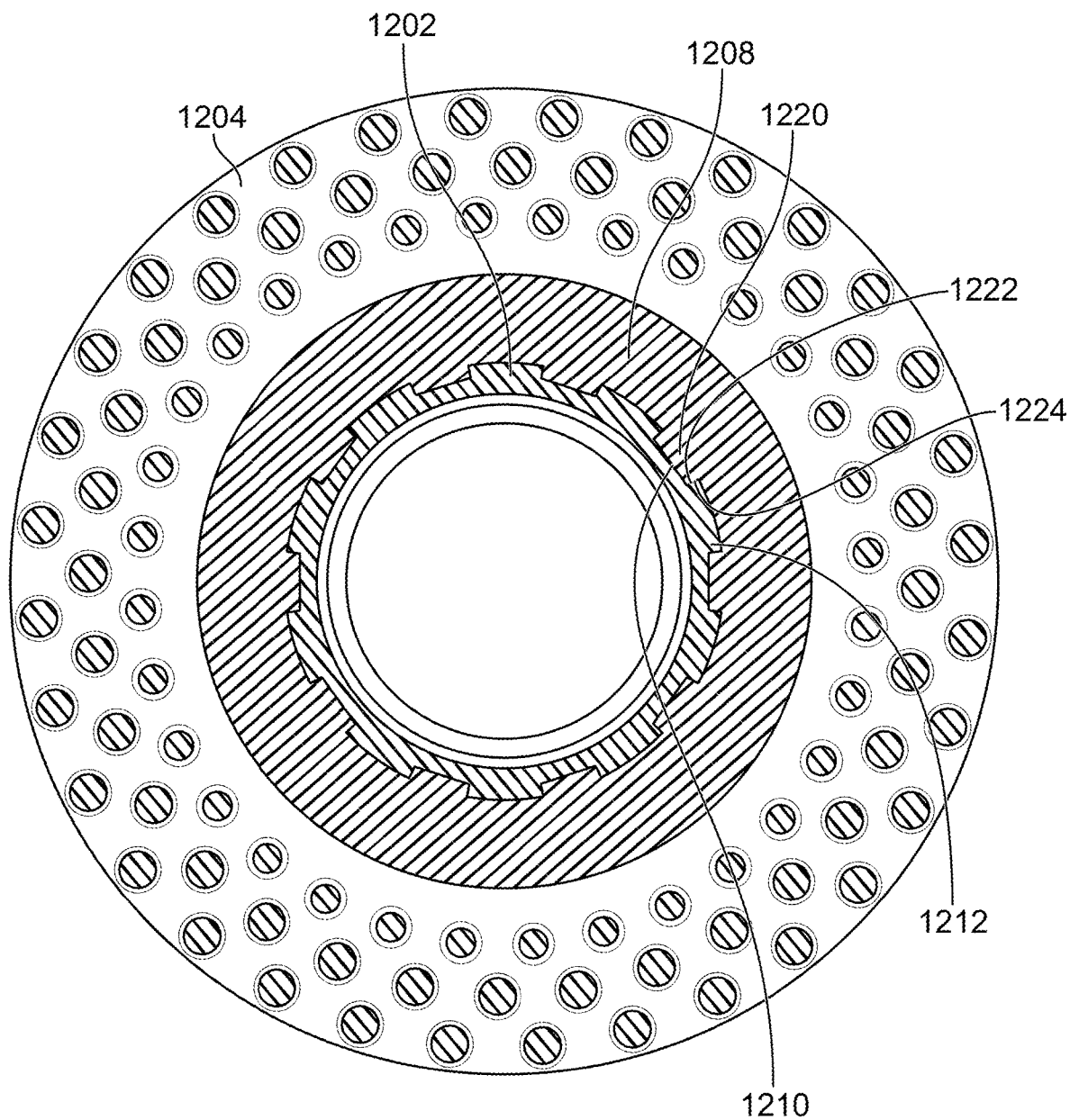
FIG. 33 is a cross-sectional view taken across line 33-33 in FIG. 31 showing projections of the rotor extending into the recesses of the wheel hub.

Regarding FIG. 33, the mounting flange 1208 of the rotor 1204 includes projections 1220 that extend into the recesses 1210 and form a meshed configuration of the projections 1220 and the lands 1212 about the wheel hub 1202. In one form, the projections 1220 and lands 1212 have a square-tooth shape, although many the shapes may be suitable, such as triangular teeth or rounded teeth as some examples. The projections 1220 each include side surfaces 1222 that engage surfaces 1224 of the adjacent lands 1212. The meshed projections 1220 and lands 1212 inhibit relative rotary movement of the wheel hub 1202 and rotor 1204.

Figure 34:
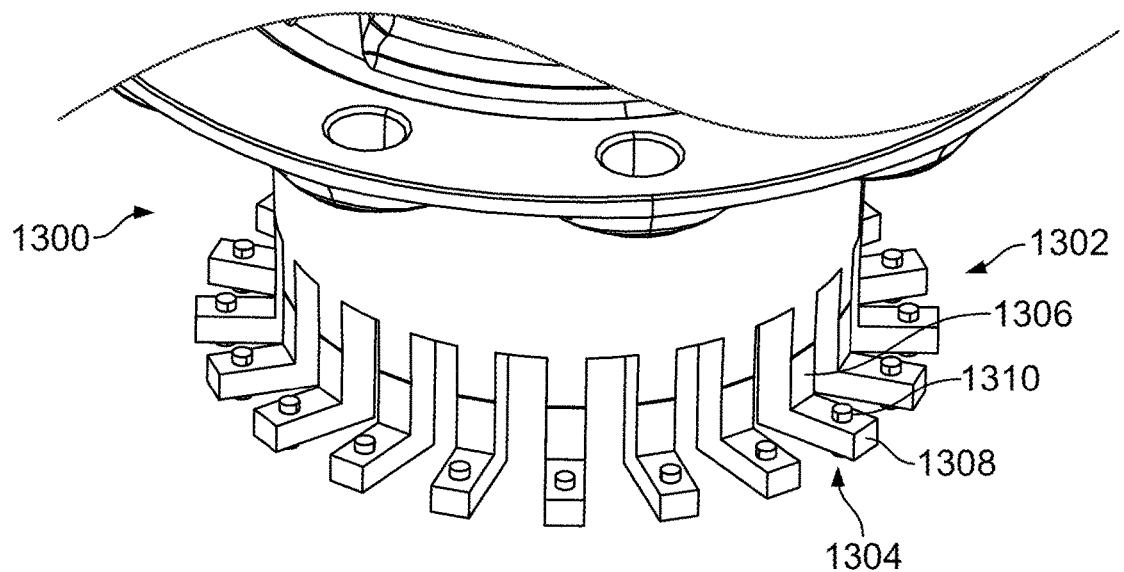
FIG. 34 is a perspective view of a portion of another wheel hub showing projections of the wheel hub with pins that engage corresponding recesses of an associated brake rotor.

It will be appreciated that other embodiments of wheel hubs and rotors may be utilized in accordance with the disclosure of this application. For example, with reference to FIG. 34, a wheel hub 1300 is provided that has a connecting portion 1302 with projections 1304 thereabout. The projections 1304 each include a leg portion 1306, a foot portion 1308, and pins 1310 extending axially in inboard and outboard directions from the foot portion 1308 to engage corresponding recesses of an associated brake rotor.

Figure 35:
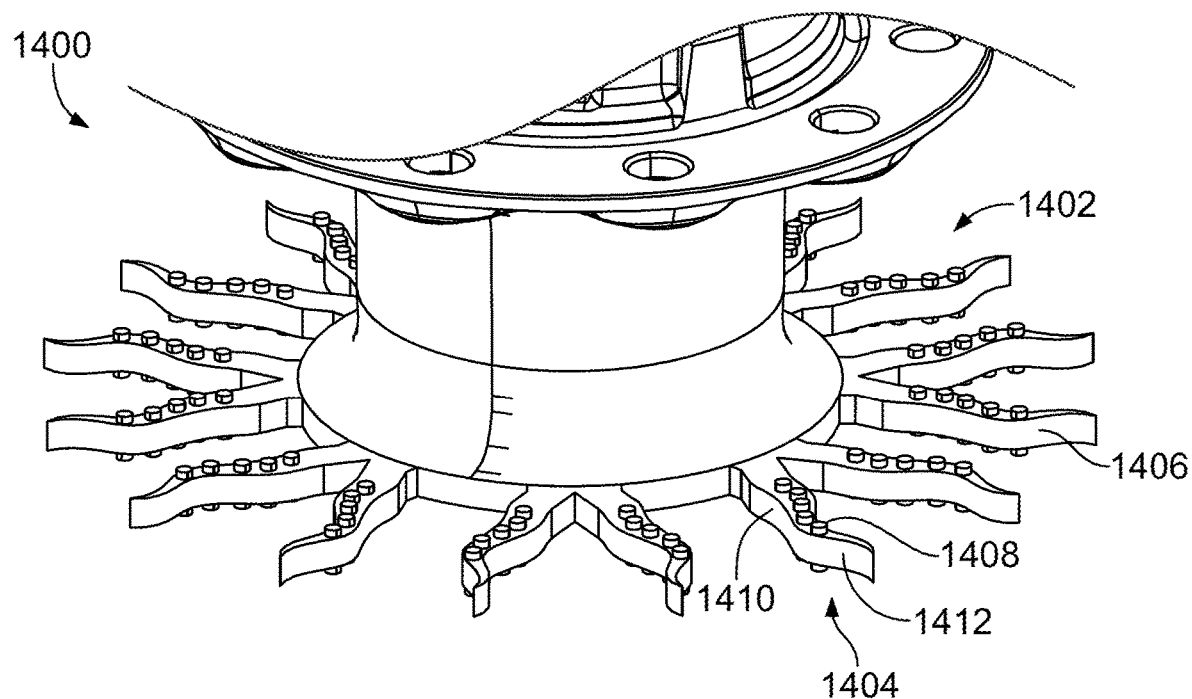
FIG. 35 is a perspective view of a portion of another wheel hub having tentacle-shaped projections with pins for engaging corresponding recesses of an associated brake rotor.

Regarding FIG. 35, a wheel hub 1400 is provided that includes a connecting portion 1402 with tentacle-shaped projections 1404. The projections 1404 may include undulating side surfaces 1406 and pins 1408. The projections 1404 may also taper as the projections 1404 extend radially outward from a thicker portion 1410 toward a thinner portion 1412. The side surfaces 1406 of the projections 1404 may engage cooperating surfaces of an associated brake rotor to inhibit relative circumferential movement of the brake rotor and the wheel hub 1400. Further, the pins 1408 of the projections 1404 may engage recesses of the brake rotor to inhibit relative radial movement of the brake rotor and the wheel hub 1400.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A wheel hub apparatus for a commercial vehicle, the wheel hub apparatus comprising:
a wheel hub having a unitary, one-piece construction;
a tubular side wall of the wheel hub;
the wheel hub rotatable about a central axis and having an inboard end portion, an outboard end portion, and a through opening extending from the inboard end portion to the outboard end portion;
a wheel mounting flange of the wheel hub axially intermediate the inboard and outboard end portions of the wheel hub, the wheel mounting flange extending radially outward from the tubular side wall of the wheel hub;
a circular brake element having a unitary, one-piece construction and extending about the wheel hub;
the inboard end portion of the wheel hub axially spaced from the wheel mounting flange by the tubular side wall of the wheel hub;
engaged portions of the inboard end portion of the wheel hub and the circular brake element securing the wheel hub and the circular brake element together, the engaged portions of the inboard end portion of the wheel hub and the circular brake element inboard of the wheel mounting flange of the wheel hub and spaced axially therefrom along the wheel hub;
the engaged portions of the wheel hub and the circular brake element fixing the circular brake element against axial movement along the wheel hub;
the engaged portions of the wheel hub and the circular brake element including projections of one of the wheel hub and the circular brake element received in recesses of the other of the wheel hub and the circular brake element;
wherein the recesses include neckdown portions and the projections have neck portions that extend in the neckdown portions; and
wherein the recesses have enlarged recess portions and the projections have corresponding enlarged portions in the enlarged recessed portions.

2. The wheel hub apparatus of claim 1 wherein one of the wheel hub and the circular brake element is formed in situ on the other of the wheel hub and the circular brake element.

3. The wheel hub apparatus of claim 1 wherein the engaged portions of the wheel hub and circular brake element include confronting surfaces of the wheel hub and circular brake element extending transverse to the central axis that fix the circular brake element against axial movement along the wheel hub.

4. The wheel hub apparatus of claim 1 wherein the engaged portions of the wheel hub and the circular brake element directly mechanically join the wheel hub and the circular brake element together.

5. A wheel hub apparatus for a commercial vehicle, the wheel hub apparatus comprising:
a wheel hub having a unitary, one-piece construction;
the wheel hub rotatable about a central axis and having an inboard end portion, an outboard end portion, and a through opening extending from the inboard end portion to the outboard end portion;
a wheel mounting portion of the wheel hub configured to have a wheel mounted thereon, the wheel mounting portion axially intermediate the inboard and outboard end portions of the wheel hub;
a circular brake element having a unitary, one-piece construction and extending about the wheel hub;
engaged portions of the wheel hub and the circular brake element securing the wheel hub and the circular brake element together;
the engaged portions of the wheel hub and the circular brake element fixing the circular brake element against axial movement along the wheel hub;
wherein the engaged portions of the wheel hub and the circular brake element include projections of one of the wheel hub and the circular brake element having free end portions fixed in recesses of the other of the wheel hub and the circular brake element; and
wherein the projections include resilient portions that bend to facilitate thermal expansion and contraction of the circular brake element during operation of the commercial vehicle.

6. A wheel hub apparatus for a commercial vehicle, the wheel hub apparatus comprising:
a wheel hub having a unitary, one-piece construction;
the wheel hub rotatable about a central axis and having an inboard end portion, an outboard end portion, and a through opening extending from the inboard end portion to the outboard end portion;
a wheel mounting portion of the wheel hub configured to have a wheel mounted thereon, the wheel mounting portion axially intermediate the inboard and outboard end portions of the wheel hub;
a circular brake element having a unitary, one-piece construction and extending about the wheel hub;
engaged portions of the wheel hub and the circular brake element securing the wheel hub and the circular brake element together;
the engaged portions of the wheel hub and the circular brake element fixing the circular brake element against axial movement along the wheel hub; and
the engaged portions of the wheel hub and the circular brake element including projections of one of the wheel hub and the circular brake element having free end portions fixed in recesses of the other of the wheel hub and the circular brake element;
wherein the engaged portions of the wheel hub and the circular brake element form a plurality of slide connections between the wheel hub and the circular brake element, the plurality of slide connections including cooperating surface portions of the wheel hub and circular brake element that permit relative sliding movement therebetween.

7. The wheel hub apparatus of claim 1 wherein the engaged portions include pin portions of one of the wheel hub and the circular brake element extending in openings of the other of the wheel hub and circular brake element.

8. A wheel hub apparatus for a commercial vehicle, the wheel hub apparatus comprising:
a wheel hub having a unitary, one-piece construction;
a tubular side wall of the wheel hub;
the wheel hub rotatable about a central axis and having an inboard end portion, an outboard end portion, and a through opening extending from the inboard end portion to the outboard end portion;
a wheel mounting flange of the wheel hub axially intermediate the inboard and outboard end portions of the wheel hub, the wheel mounting flange extending radially outward from the tubular side wall of the wheel hub;
a circular brake element having a unitary, one-piece construction and extending about the wheel hub;
the inboard end portion of the wheel hub axially spaced from the wheel mounting flange by the tubular side wall of the wheel hub;
engaged portions of the inboard end portion of the wheel hub and the circular brake element securing the wheel hub and the circular brake element together, the engaged portions of the inboard end portion of the wheel hub and the circular brake element inboard of the wheel mounting flange of the wheel hub and spaced axially therefrom along the wheel hub;
the engaged portions of the wheel hub and the circular brake element fixing the circular brake element against axial movement along the wheel hub;
wherein the engaged portions include meshed teeth of the wheel hub and the circular brake element.

9. The wheel hub apparatus of claim 1 further comprising:
fasteners protruding from the wheel mounting flange for connecting a wheel to the wheel hub.

10. The wheel hub apparatus of claim 1 wherein the wheel hub includes a pair of wheel bearing seats, the wheel hub apparatus further comprising:
a pair of wheel bearings having openings to receive a vehicle spindle, the wheel bearings supported on the bearing seats;
a spacer separating the wheel bearings; and
a spindle lock to engage the spindle and retain the wheel hub on the spindle.

11. A wheel hub apparatus comprising:
a wheel hub having a unitary, one-piece construction and configured to have a wheel mounted thereon;
a pair of wheel bearings having openings to receive a vehicle spindle;
wheel bearing seats of the wheel hub to support the wheel bearings;
a circular brake element;
one of the wheel hub and the circular brake element formed in situ on the other of the wheel hub and the circular brake element; and
projections and recesses of the wheel hub and the circular brake element, the projections extending in the recesses to transfer loading between the circular brake element and the wheel hub during a braking operation,
wherein the projections each include a free end fixed in one of the recesses and a resilient portion configured to bend to accommodate thermal expansion and contraction of the circular brake element.

12. The wheel hub apparatus of claim 11 wherein the projections and recesses of the wheel hub and circular brake element form a direct mechanical joint between the wheel hub and circular brake element that permanently joins the wheel hub and the circular brake element together.

13. The wheel hub apparatus of claim 11 wherein the recesses have an undercut configuration and the projections include enlarged portions that fill the corresponding recesses in which the projections are received and fix the enlarged portions of the projections in the recesses.

14. A wheel hub apparatus comprising:
a wheel hub having a unitary, one-piece construction and configured to have a wheel mounted thereon;

a pair of wheel bearings having openings to receive a vehicle spindle;

wheel bearing seats of the wheel hub to support the wheel bearings;

a circular brake element;

one of the wheel hub and the circular brake element formed in situ on the other of the wheel hub and the circular brake element;

projections and recesses of the wheel hub and the circular brake element, the projections extending in the recesses to transfer loading between the circular brake element and the wheel hub during a braking operation; and wherein the projections and recesses form slide connections between the wheel hub and the circular brake element that facilitate expansion and contraction of the circular brake element during vehicle operation, the slide connections including cooperating surface portions of the wheel hub and circular brake element that permit relative sliding movement therebetween.

15. The wheel hub apparatus of claim 11 wherein the recesses include neckdown portions and the projections have neck portions that extend in the neckdown portions; and wherein the recesses have enlarged recess portions and the projections have corresponding head portions in the enlarged recessed portions.

16. The wheel hub apparatus of claim 11 wherein the projections each extend in a radial direction into an associated one of the recesses; and wherein the recesses each have a width perpendicular to the radial direction that varies along the radial direction so that the recess has a neckdown portion and an enlarged portion, the neckdown portion resisting pull-through of the associated projection in the radial direction.

17. The wheel hub apparatus of claim 11 wherein the projections include a first plurality of teeth and the recesses include a second plurality of teeth; and wherein the first and second pluralities of teeth are meshed.

18. The wheel hub apparatus of claim 14 wherein the projections and recesses include engaged rail portions and grooves that include the cooperating surface portions.

19. A wheel hub apparatus comprising:

a wheel hub having a unitary, one-piece construction and configured to have a wheel mounted thereon;

a pair of wheel bearings having openings to receive a vehicle spindle;

wheel bearing seats of the wheel hub to support the wheel bearings;

a circular brake element;

one of the wheel hub and the circular brake element formed in situ on the other of the wheel hub and the circular brake element;

projections and recesses of the wheel hub and the circular brake element, the projections extending in the recesses to transfer loading between the circular brake element and the wheel hub during a braking operation; and wherein the projections include loops having openings and the recesses include locking portions extending in the openings of the loops.

20. The wheel hub apparatus of claim 11 wherein the circular brake element includes the projections and the wheel hub includes the recesses.

21. A wheel hub apparatus comprising:

a wheel hub having a unitary, one-piece construction and configured to have a wheel mounted thereon;

a pair of wheel bearings having openings to receive a vehicle spindle;

wheel bearing seats of the wheel hub to support the wheel bearings;

a circular brake element;

one of the wheel hub and the circular brake element formed in situ on the other of the wheel hub and the circular brake element;

projections and recesses of the wheel hub and the circular brake element, the projections extending in the recesses to transfer loading between the circular brake element and the wheel hub during a braking operation; and a spindle lock configured to threadingly engage the spindle and sandwich one of the wheel bearings between the spindle lock and one of the wheel bearing seats.

22. A method of producing a wheel hub apparatus, the method comprising:

casting one of a wheel hub and a circular brake element, the wheel hub having a unitary, one-piece configuration and configured to have a wheel mounted thereon, the wheel hub including and a pair of bearing seats;

positioning the one of the wheel hub and the circular brake element in a mold; and casting the other of the wheel hub and the circular brake element on the one of the wheel hub and the circular brake element using the mold, wherein casting the other of the wheel hub and the circular brake element on the one of the wheel hub and the circular brake element includes forming a plurality of slide connections between the wheel hub and the circular brake element, the plurality of slide connections including cooperating surface portions of the wheel hub and circular brake element that permit relative sliding movement of the cooperating surface portions.

23. The method of claim 22 wherein casting the one of the wheel hub and the circular brake element includes casting the one of the wheel hub and the circular brake element using a first mold;

wherein positioning the one of the wheel hub and the circular brake element in the mold includes positioning the one of the wheel hub and the circular brake element in a second mold; and wherein casting the other of the wheel hub and the circular brake element on the one of the wheel hub and the circular brake element includes using the second mold.

24. The wheel hub apparatus of claim 1 wherein the circular brake element is a brake rotor having internal air flow paths, the wheel hub apparatus further comprising:

axially extending through openings formed between the wheel hub and the brake rotor that permit air to enter the through openings and travel into the internal air flow paths of the brake rotor.

25. The wheel hub apparatus of claim 5 wherein the free end portions include enlarged portions and the recesses include narrowed portions that resist pull-through of the enlarged portions.

26. The wheel hub apparatus of claim 5 wherein the engaged portions include meshed teeth of the wheel hub and circular brake element.

27. The wheel hub apparatus of claim 5 wherein the engaged portions include openings of one of the wheel hub and circular brake element and locking portions of the other of the wheel hub and circular brake element extending in the openings.

28. The wheel hub apparatus of claim 6 wherein the engaged portions include rail portions and grooves that include the cooperating surface portions.

29. The wheel hub apparatus of claim 6 wherein the circular brake element is a brake rotor having internal air flow paths, the wheel hub apparatus further comprising:
    axially extending through openings formed between the wheel hub and the brake rotor that permit air to enter the through openings and travel into the air flow paths of the brake rotor.

30. The wheel hub apparatus of claim 6 wherein the slide connections restrict relative movement of the wheel hub and the circular brake element to movement along a radial direction that is orthogonal to the central axis.

31. The wheel hub apparatus of claim 21 wherein the projections include resilient portions that bend to facilitate thermal expansion and contraction of the circular brake element during operation.

32. The wheel hub apparatus of claim 21 wherein the projections and recesses form slide connections between the wheel hub and the circular brake element that facilitates expansion and contraction of the circular brake element during vehicle operation, the slide connections including cooperating surface portions of the wheel hub and circular brake element that permit relative sliding movement therebetween.

33. The wheel hub apparatus of claim 21 wherein the circular brake element is a brake rotor having internal air flow paths, the wheel hub apparatus further comprising:
    axially extending through openings formed between the wheel hub and the brake rotor that permit air to enter the through openings and travel into the air flow paths of the brake rotor.

34. The wheel hub apparatus of claim 8 wherein the teeth are triangular.

35. The wheel hub apparatus of claim 21 wherein the projections and recesses include pin portions of one of the wheel hub and the circular brake element extending in openings of the other of the wheel hub and circular brake element.

\* \* \* \* \*